(12) United States Patent
Odajima

(10) Patent No.: US 8,180,612 B2
(45) Date of Patent: May 15, 2012

(54) ELECTROMAGNETIC FIELD SIMULATOR AND ELECTROMAGNETIC FIELD SIMULATING PROGRAM PRODUCT

(75) Inventor: Wataru Odajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 777 days.

(21) Appl. No.: 11/742,529

(22) Filed: Apr. 30, 2007

(65) Prior Publication Data

US 2008/0077367 A1 Mar. 27, 2008

(30) Foreign Application Priority Data

Sep. 27, 2006 (JP) ................................. 2006-262447

(51) Int. Cl.
*G06G 7/48* (2006.01)
*G06G 7/62* (2006.01)
*G06F 17/50* (2006.01)
(52) U.S. Cl. ............................................. 703/6; 703/13
(58) Field of Classification Search .................. 703/6, 13
See application file for complete search history.

(56) References Cited

U.S. PATENT DOCUMENTS

| | | | | |
|---|---|---|---|---|
| 6,397,171 | B1* | 5/2002 | Belk | 703/14 |
| 2003/0137511 | A1* | 7/2003 | Aruga et al. | 345/426 |
| 2004/0024576 | A1* | 2/2004 | Meuris et al. | 703/6 |
| 2005/0192764 | A1* | 9/2005 | Holland | 702/28 |

FOREIGN PATENT DOCUMENTS

JP 2000-227450 8/2000

OTHER PUBLICATIONS

Natalia Nikolova, The Finite difference Time Domain (FDTM) Method—Part 1, http://dougneubauer.com/wp-content/uploads/wdata/docs/lecture7-2004.pdf, 2004, 25 pages.*
Chigrin, Dmitry, "Electromagnetic Green's fnction calculation with finite difference time domain method", 2007, 47 pages.*
Shibayama et al, "A finite-difference time domain beam-propagation method for TE- and TM-wave analyses", journal of lightwave technology, vol. 21 No. 7, Jul. 2003, 7 pages.*
Kane S. Yee "Numerical Solution of Initial Boundary Value Problems Involving Maxwell's Equations in Isotropic Media" IEEE Transactions on Antennas and Propagation. vol. 1, AP-14, No. 3, May 1966, pp. 302-307.
Toru, Uno, "Finite Difference Time Domain Method for Electromagnetic Field and Antenna Analyses," Corona Publishing Co., Ltd., 1998, pp. 1-33.

(Continued)

*Primary Examiner* — David Silver
(74) *Attorney, Agent, or Firm* — Staas & Halsey LLP

(57) ABSTRACT

An electromagnetic field simulator for repeatedly calculating a space distribution of an electromagnetic field at a next point in time using a distribution of an electromagnetic field in a 3-dimensional space includes: a unit for calculating a distribution of an electric field and a distribution of an magnetic field on the entire 3-dimensional space; a unit for calculating a distribution of an electric field and a distribution of an magnetic field on a 2-dimensional space on a cut plane obtained by cutting the 3-dimensional space by a plane; a unit for setting an excitation condition of generating an electromagnetic wave by using a calculation result of the 2-dimensional electromagnetic field calculating unit; and a unit for generating an electromagnetic wave by forcibly vibrating a part of the electric field and the magnetic field in the 3-dimensional space on a basis of the excitation condition set.

6 Claims, 17 Drawing Sheets

OTHER PUBLICATIONS

Allen Taflove et al., "Compuational Electrodynamics", Artech House, Inc., 2000, pp. 192-225.

Notice of Rejection Ground for Japanese Patent Application No. 2006-262447; mailed Mar. 21, 2012.

S. Hasegawa et al., "Optics Simulator for Use in Nano-Optics Analysis"; Fujitsu, vol. 56, No. 4, Jul. 2005, printed Mar. 13, 2012 from img.jp.fujitsu.com/downloads/jp/jmag/vol56-4/paper06.pdf; pp. 299-306.

N. Kinoshita; "Simulation of Holographic Storage using Finite-Difference Time-Domain Method"; Reports on Technical Research, The Institute of Electronics, Information and Communication Engineers (IEICE), Feb. 2005, pp. 43-47.

* cited by examiner

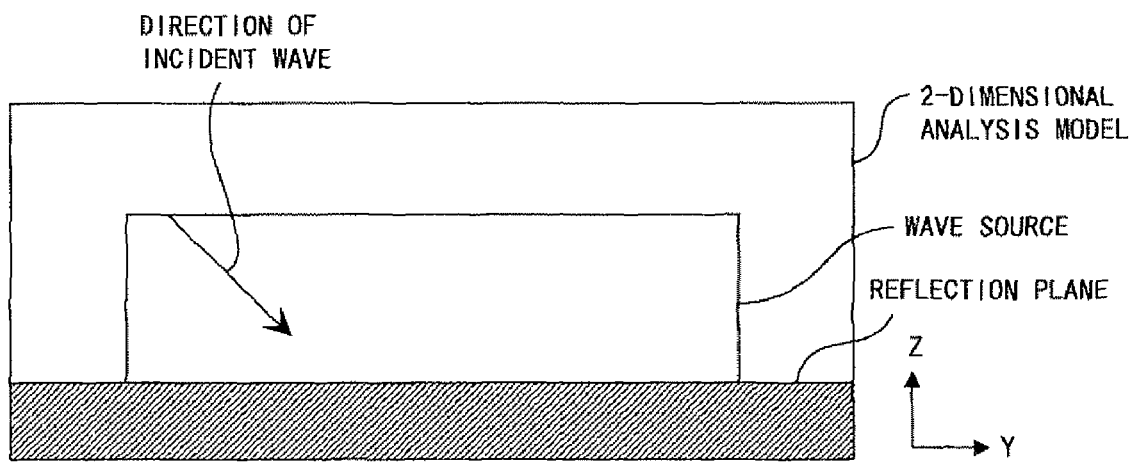
F I G. 8

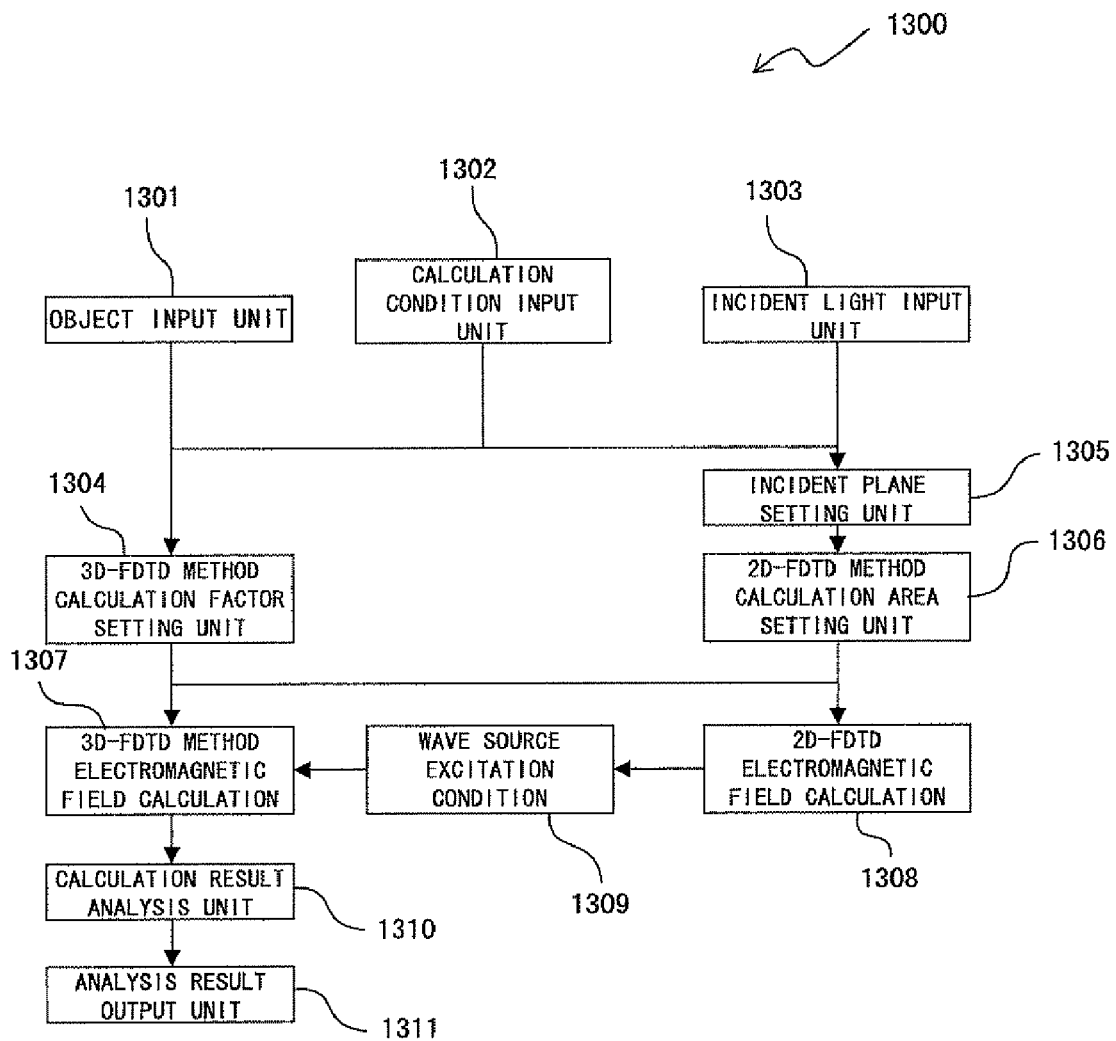
F I G. 9

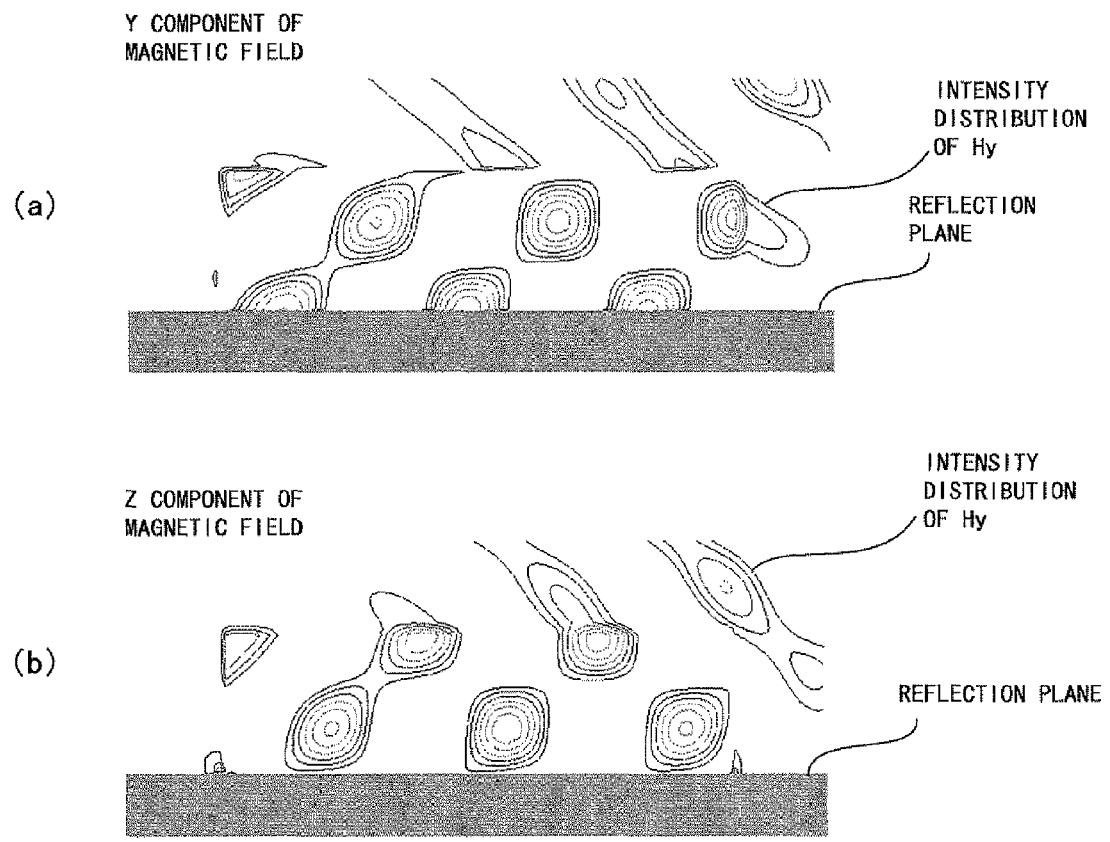
F I G. 1 2

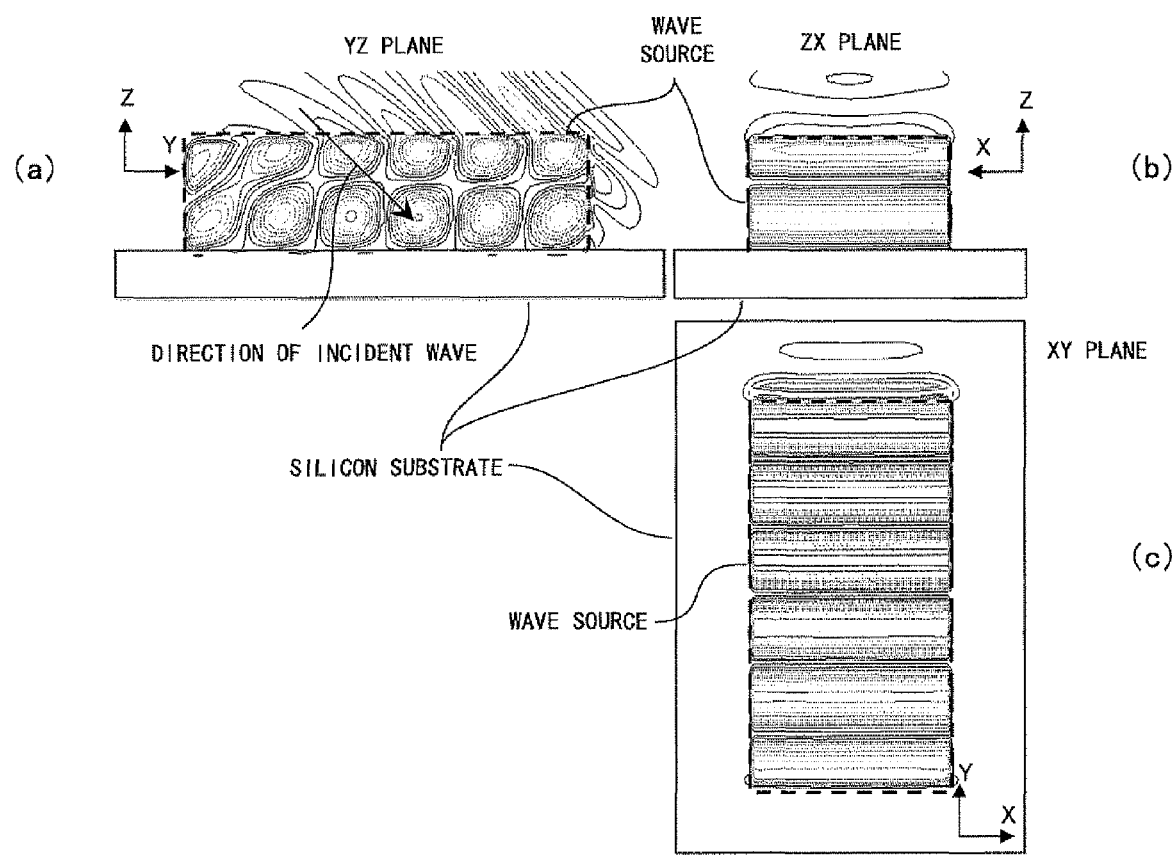
F I G. 14

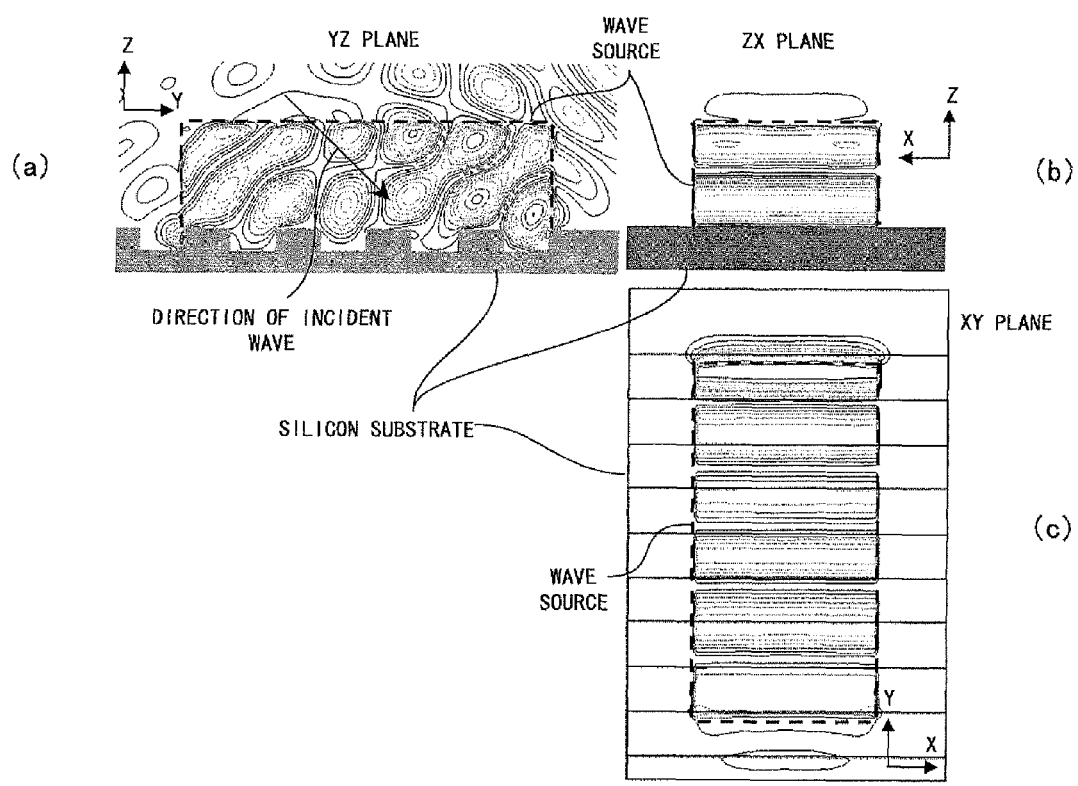
F I G. 15

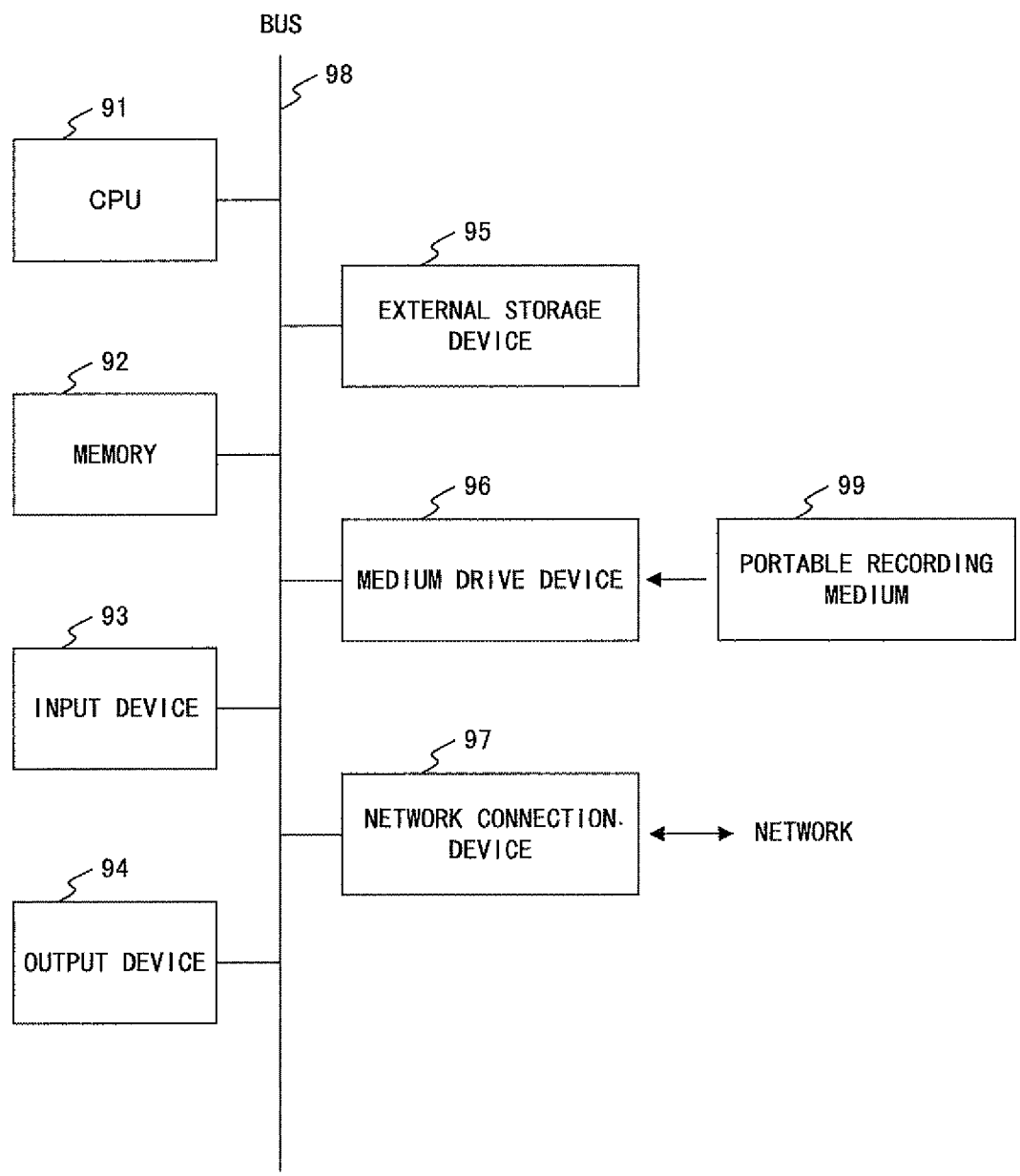
F I G. 16

ELECTROMAGNETIC FIELD SIMULATOR AND ELECTROMAGNETIC FIELD SIMULATING PROGRAM PRODUCT

CROSS REFERENCE TO RELATED APPLICATIONS

This application is based on Japanese Application No. 2006-262447, filed on Sep. 27, 2006, the disclosures of which are hereby incorporated herein by reference.

BACKGROUND OF THE INVENTION

1. Field of the Invention

The present invention relates to an electromagnetic field simulator for simulating an electromagnetic field, an electromagnetic field analysis system for analyzing an electromagnetic field, an electromagnetic field simulating program product for using a computer to simulate an electromagnetic field, and an electromagnetic field simulating program product for using a computer to analyze an electromagnetic field, and more specifically to a technique of correctly modeling an electromagnetic wave irradiated to an analysis area.

2. Description of the Related Art

Conventionally, to analyze the performance and the like of a communication antenna, an electromagnetic field simulator and an electromagnetic field simulating program for calculating an electromagnetic field for a communication device and the like are well known. As a typical method which is applied the electromagnetic field simulator and the electromagnetic field simulating program for analyzing an electromagnetic field, a finite difference time domain method (FDTD method) is well known (for example, the documents 1 and 2 described below).

The method is a finite difference calculation of Maxwell's equations which is basic equations of the electromagnetic field, and is used for the calculation of the electromagnetic field. In this method, the change of the electromagnetic field is simulated in detail by setting a sufficiently short time step and a small space between grids. The merits of the FDTD method are a high-speed performance because of a simple calculation, a transitional analysis of the electromagnetic wave by a calculation of a waveform, and suitable for 3-dimensional calculation, etc.

The Maxwell's equations are configured by the following equations 1 and 2.

$$\nabla \times H - \varepsilon \frac{\partial E}{\partial t} = \sigma E \quad \text{(equation 1)}$$

$$\nabla \times E + \mu \frac{\partial H}{\partial t} = 0 \quad \text{(equation 2)}$$

where E indicates an electric field vector, H indicates an electromagnetic field vector, $\varepsilon$ indicates a permittivity, $\sigma$ indicates a conductivity, and $\mu$ indicates a permeability.

The equations 3 and 4 which are obtained from the equation 1 and 2 to calculate the change of an electromagnetic field component are shown below. (refer to Allen Taflove, Suan C. Hagness: "Computational Electrodynamics" (ARTECH HOUCE, INC.)).

$$E_x|_{i+1/2,j,k}^{n} = \left(\frac{1 - \frac{\sigma_{i+1/2,j,k}\Delta t}{2\varepsilon_{i+1/2,j,k}}}{1 + \frac{\sigma_{i+1/2,j,k}\Delta t}{2\varepsilon_{i+1/2,j,k}}}\right) E_x|_{i+1/2,j,k}^{n-1} + \quad \text{(equation 3)}$$

$$\left(\frac{\frac{\Delta t}{\varepsilon_{i+1/2,j,k}}}{1 + \frac{\sigma_{i+1/2,j,k}\Delta t}{2\varepsilon_{i+1/2,j,k}}}\right) \cdot \left(\frac{H_z|_{i+1/2,j+1/2,k}^{n-1/2} - H_z|_{i+1/2,j-1/2,k}^{n-1/2}}{\Delta y} - \frac{H_y|_{i+1/2,j,k+1/2}^{n-1/2} - H_y|_{i+1/2,j,k-1/2}^{n-1/2}}{\Delta z}\right)$$

$$H_x|_{i,j+1/2,k+1/2}^{n+1/2} = H_x|_{i,j+1/2,k+1/2}^{n-1/2} \quad \text{(equation 4)}$$

$$+ \left(\frac{\Delta t}{\mu_{i,j+1/2,k+1/2}}\right) \cdot \left(\frac{E_y|_{i,j+1/2,k+1}^{n} - E_y|_{i,j+1/2,k}^{n}}{\Delta z} - \frac{E_z|_{i,j+1,k+1/2}^{n} - E_z|_{i,j,k+1/2}^{n}}{\Delta y}\right)$$

where Ex, Ey, and Ez indicate each component in an electric field, Hx, Hy, and Hz indicate each component in an electromagnetic field, $\varepsilon$ indicates a permittivity, $\sigma$ indicates a conductivity, $\Delta x$, $\Delta y$, and $\Delta z$ indicate a space grid width, and $\Delta t$ indicates the width of a time division.

The subscripts i, j, and k at the lower right of the electromagnetic field component are the numbers of a space grid. They indicate the coordinates of a simulation space.

FIG. 1 shows the arrangement of each component of an electric field and a magnetic field with the FDTD method.

FIG. 1 shows one cell obtained by dividing an analysis model to which the FDTD method is applied, and the space arrangement of the component of each electric field and magnetic field in one cell is shown. The subscripts n and n+1 at the upper right of the electromagnetic field component are the time steps. When the time step advances 1, the time advances $\Delta t$. By sequentially repeating the equations 3 and 4, the change of an electromagnetic field in the 3-dimensional space can be calculated.

Since the FDTD method performs a calculation with the finite difference method, it is necessary to set the space between the grids on short distance about 1/10~1/20 of the wavelength of the electromagnetic wave. During the calculation, the momentary values of the electromagnetic fields in a whole of the analysis model are stored in the main storage such as RAM (random access memory) and the like. Since the storage capacity of a computer is restricted, the size of a model must be generally within several times larger than the wavelength. Since the wavelength of light is equal to or less than 1 micrometer, the analysis area with the FDTD method is within several micrometers. For that reason there have been few cases in which the FDTD method is applied to the optical simulation.

Recently, near-field optics using an optical component having a structure smaller than the wavelength of light has attracted an attention. Because the diffraction has a serious influence on the light wave propagation in the near-field optics, it is impossible to use a ray tracing technique. In this case, the light is processed as an electromagnetic wave, and the propagation calculation of the light is performed in the same method as in the analysis of an electric wave. The analysis is originally a 3-dimensional calculation, and an analysis area is several times larger than that of the wavelength. Therefore, the FDTD method is effective. The study of the near-field optics and the development of an optical device with the FDTD method have been actively performed.

When an optical analysis is performed with the FDTD method, the analysis is frequently performed with the light irradiated from a outside of an analysis area because the analysis area is within several micrometers for the above-mentioned reason. The analysis including the light source such as a laser device and the like cannot be performed. For incident light is reproduced, the electromagnetic field of a part of an analysis area are vibrated by the frequency of the light. If the vibration of the electric field executed with the repetition of the calculation of the equations 3 and 4, the vibration propagates to the surrounding electromagnetic fields, thereby propagating the electromagnetic wave, that is, simulating the propagation of the light. The area in which an electromagnetic field is excited is referred to as a wave source because an electromagnetic wave is generated from the area. The wave source is virtually set to execute a calculation, but does not practically exist in an actual analysis object.

To perform a correct analysis, it is important to correctly model the light propagating from the wave source. For example, if the wavelength, the direction, and the polarization state of incident light satisfy a predetermined condition with respect to a small particle, thin film, etc. in nanometer size, light is located locally with Plasmon resonance, which is a well known phenomenon. Furthermore, since common optical phenomena such as reflection, refraction, etc. also largely depend on the conditions of incident light, correct incident light settings are required.

Especially required in setting the incident light is the function of impinging a plane wave with a uniform intensity distribution at an arbitrary angle into an object. A plane wave refers to the phase of an electromagnetic wave aligned on the perpendicular plane to the travel direction.

In a practical experiment system, a beam launched from a laser device is normally some millimeters in diameter, and when the beam is focused by a single lens, it is still several tens of micrometers in diameter. Therefore, in a narrow analysis area of several micrometers to be applied the FDTD method, uniform intensity distribution of the incident beam is an accurate analysis condition for realizing a simulation. In addition, it is necessary to confirm the accuracy of calculations. However, considering the comparisons with other calculating methods, a plane wave with uniform intensity distribution is assumed inmost cases in an analytic calculation performed by solving an equation. Therefore, it is also necessary to perform a calculation for comparison by setting a plane wave with uniform intensity distribution in the FDTD method.

However, incident light cannot be set as a plane wave with uniform intensity distribution only by simply exciting an electric field and a magnetic field in a perpendicular plane area to the electromagnetic wave propagation direction.

FIG. 2 shows an electric field distribution of an electromagnetic wave from a wave source on which an electric field is excited with a uniform amplitude and phase on one excitation plane.

Since an electromagnetic wave is generated on both side of a wave source on which only the electric field is excited, the electromagnetic wave is made to propagate only in one direction by exciting the magnetic field as well as the electric field in the calculation shown in FIG. 2. While the excitation condition is based on modeling a plane wave, a propagating electromagnetic wave is non-uniform intensity distribution, and spreads in the ±X directions, thereby failing in generating a plane wave because a diffraction phenomenon occurs in the electromagnetic wave.

Since the FDTD method is directly calculation in the entire analysis space, interference and diffraction are reproduced as in natural phenomena. In FIG. 2, since the electric field amplitude is kept constant on the excitation plane, intense diffraction is caused by the same phenomenon as a cutoff electromagnetic wave at the edge of the excitation plane. To realize a plane wave with uniform intensity distribution in the FDTD method, it is necessary to take measures against the diffraction.

The simplest method for suppressing the diffraction is to set the intensity distribution on the Gaussian distribution, and set the electric field intensity on the excitation plane boundary to 0. If the distribution width is sufficiently large, it is assumed that uniform intensity distribution has been approximately obtained. Since this method can be easily realized by changing the intensity distribution without changing the configuration of the excitation plane. However, there are the problems with this method that the uniform intensity distribution cannot be realized only approximately, and a large calculation area is required.

Although diffraction does not occur at the edge of the excitation area in the Gaussian distribution, the influence of diffraction develops when the distribution width is as small as the wavelength, and the electromagnetic wave changes into a spreading wave. Although the diffraction can be smaller if the distribution width is large, an excitation plane exceeding the wavelength is set even if a target object is smaller than the wavelength of incident light and is some nanometers in size, thereby largely increasing the calculation time and required memory size. To efficiently perform an analysis, a wave source that suppresses diffraction for any small excitation area is required.

To realize incident light of uniform intensity by suppressing a diffraction phenomenon, there is a method described in the following document 3.

FIG. 3 shows the electric field intensity distribution of an electromagnetic wave propagating from the wave source configured by six excitation planes.

As shown in FIG. 3, diffraction can be suppressed by enclosing the area in which the electromagnetic wave propagates, and exciting the electric fields and the electromagnetic fields of all excitation planes on the basis of the propagating electromagnetic wave.

Practically described below is the method of suppressing diffraction.

FIG. 4 shows the conventional wave source configured by six excitation planes.

As shown in FIG. 4, a wave source configured by six excitation planes for an analysis space is assumed to consider a case in which an electromagnetic wave propagates in the Z direction from an excitation plane 1 perpendicular to the travel direction of the electromagnetic wave.

Assume that the electromagnetic field of an electromagnetic wave vibrates only in the X direction. Excitation planes 2 through 5 perpendicularly contacting the four sides of the excitation plane 1 are arranged. The excitation planes 2 and 3 are perpendicular to the X-axis, and the excitation planes 4 and 5 are perpendicular to the Y-axis. To suppress the diffraction, the electric fields and the electromagnetic fields of the excitation planes 2 through 5 are excited so that an electromagnetic wave can propagate inside the area enclosed by the excitation planes 1 through 6, the electromagnetic field can be 0 outside the area, and it cannot affect the inside.

First consider the excitation plane 2 perpendicular to the X-axis.

The number of the grid in the X direction on the excitation plane 2 is assigned i1, and it is assumed that an electromagnetic wave propagates in an area having a larger grid number.

The components arranged on the excitation planes 2 and 3 are Ey, Ez, and Hx. The equations for calculating the three components in the FDTD method are expressed as the following equations 5, 6, and 7.

$$Ey|_{i_1,j+1/2,k}^{n} = Cy_{i_1,j+1/2,k} \cdot Ey|_{i_1,j+1/2,k}^{n-1} + \quad \text{(equation 5)}$$
$$Gy_{i_1,j+1/2,k} \cdot \left\{ \frac{Hx|_{i_1,j+1/2,k+1/2}^{n-1/2} - Hx|_{i_1,j+1/2,k-1/2}^{n-1/2}}{\Delta z} - \frac{Hz|_{i_1+1/2,j+1/2,k}^{n-1/2} - Hz|_{i_1-1/2,j+1/2,k}^{n-1/2}}{\Delta x} \right\}$$

$$Ez|_{i_1,j,k+1/2}^{n} = Cz_{i_1,j,k+1/2} Ez|_{i_1,j,k+1/2}^{n-1} + \quad \text{(equation 6)}$$
$$Gz_{i_1,j,k+1/2} \cdot \left\{ \frac{Hy|_{i_1+1/2,j,k+1/2}^{n-1/2} - Hy|_{i_1-1/2,j,k+1/2}^{n-1/2}}{\Delta x} - \frac{Hx|_{i_1,j+1/2,k+1/2}^{n-1/2} - Hx|_{i_1,j-1/2,k+1/2}^{n-1/2}}{\Delta y} \right\}$$

$$Hx|_{i_1,j+1/2,k+1/2}^{n+1/2} = Hx|_{i_1,j+1/2,k+1/2}^{n-1/2} + \quad \text{(equation 7)}$$
$$Bx_{i1,j+1/2,k+1/2} \left( \frac{Ey|_{i_1,j+1/2,k+1}^{n} - Ey|_{i_1,j+1/2,k}^{n}}{\Delta z} - \frac{Ez|_{i_1,j+1,k+1/2}^{n} - Ez|_{i_1,j,k+1/2}^{n}}{\Delta y} \right)$$

To simplify the expression, the factors are collectively defined as Cy, Gy, Cz, Gz, and Bx. The equation 7 is the same as the equation 4.

If By, Ez, and Hx can be constantly 0 with respect to the travel of an electromagnetic wave, the area in which the electromagnetic wave does not propagates is constantly 0, thereby causing no diffraction. Since the propagating electromagnetic wave is X-polarized in the Z direction, Ey, Ez, Hx, and Hz are 0, and Ex and Hy have values other than 0.

An equation including Hy is the equation 6. This equation includes two Hy, that is, Hy (i1+½, j, k+½) and Hy (i1−½, j, k+½). Since the grid number i1+½ in the X direction belongs to the area in which the electromagnetic wave propagates, it has a value other than 0. Since i1−½ is outside the area, it has the value of 0. Therefore, the value of 0 can be obtained by calculating Hy when the electromagnetic wave propagates and subtracting the result from Ez. That is, the following equation 8 is executed.

$$Ez|_{i_1,j,k+1/2}^{n} = Ez|_{i_1,j,k+1/2}^{n} - G_{i_1,j,k+1/2} \frac{Hy_{wave}|_{i_1+1/2,j,k+1/2}^{n+1/2}}{\Delta x} \quad \text{(equation 8)}$$

The Hy wave is an electromagnetic field component of the electromagnetic wave, and is calculated by the following equation 9.

$$Hy_{wave}|_{i_1+1/2,j,k+1/2}^{n-1/2} = Z \cdot E_0 \sin[\omega(n-1/2)\Delta t + \phi_{i_1+1/2,j,k+1/2}] \quad \text{(equation 9)}$$

where E0 indicates the amplitude of the electric field of the electromagnetic wave, Z indicates the impedance of the space, $\phi_{i_1+1/2,j,k+1/2}$ indicates the phase of the electromagnetic field in the grid coordinates ($i_1$+½,j,k+½), and ω indicates the angular frequency of the electromagnetic wave.

When Ez is forcibly set to 0 without performing the procedure, the electromagnetic field calculation is not performed on the plane. Therefore, the electromagnetic wave is reflected. To avoid it, the equation 8 for erasing the electromagnetic field Hy is to be performed after first applying the equation 6. The same concept can be applied to the excitation plane 3. Since the inside and the outside are reversed, the arithmetic of adding the Hy wave calculated from the propagation of the electromagnetic wave is performed.

Next, the excitation plane 4 perpendicular to the Y-axis is considered.

Since the excitation electric field Ex of the electromagnetic wave is located at the grid number j1 in the Y direction, the coordinates set to 0 are located j1−½ at a half cell outside. The components of j1−½ plane are Ey, Hx, and Hz, and the respective equations are the following equations 10, 11, and 12.

$$Ey|_{i,j_1-1/2,k}^{n} = Cy_{i,j_1-1/2,k} \cdot Ey|_{i,j_1-1/2,k}^{n-1} + \quad \text{(equation 10)}$$
$$Gy_{i,j_1-1/2,k} \cdot \left\{ \frac{Hx|_{i,j_1-1/2,k+1/2}^{n-1/2} - Hx|_{i,j_1-1/2,k-1/2}^{n-1/2}}{\Delta z} - \frac{Hz|_{i+1/2,j_1-1/2,k}^{n-1/2} - Hz|_{i-1/2,j_1-1/2,k}^{n-1/2}}{\Delta x} \right\}$$

$$Hx|_{i,j_1-1/2,k+1/2}^{n+1/2} = Hx|_{i,j_1-1/2,k+1/2}^{n-1/2} + \quad \text{(equation 11)}$$
$$Bx_{i,j_1-1/2,k+1/2} \left( \frac{Ey|_{i,j_1-1/2,k+1}^{n} - Ey|_{i,j_1-1/2,k}^{n}}{\Delta z} - \frac{Ez|_{i,j_1,k+1/2}^{n} - Ez|_{i,j_1-1,k+1/2}^{n}}{\Delta y} \right)$$

$$Hz|_{i+1/2,j_1-1/2,k}^{n+1/2} = Hz|_{i+1/2,j_1-1/2,k}^{n-1/2} + \quad \text{(equation 12)}$$
$$Bz_{i+1/2,j_1-1/2,k} \left( \frac{Ex|_{i+1/2,j_1,k}^{n} - Ex|_{i+1/2,j_1-1,k}^{n}}{\Delta y} - \frac{Ey|_{i+1,j_1-1/2,k}^{n} - Ey|_{i,j_1-1/2,k}^{n}}{\Delta x} \right)$$

In the equations above, only the component Ex has a value other than 0, and the corresponding equation is the equation 12. Therefore, if Ex is calculated from the propagation of the electromagnetic wave and the related terms are removed from the equation 12, then Hz can be set to 0.

$$Hz|_{i+1/2,j_1-1/2,k}^{n+1/2} = Hz|_{i+1/2,j_1-1/2,k}^{n+1/2} + \quad \text{(equation 13)}$$
$$Bz_{i+1/2,j_1-1/2,k} \frac{Ex_{wave}|_{i+1/2,j_1-1,k}^{n}}{\Delta y}$$

$$Ex_{wave}|_{i+1/2,j_1-1,k}^{n} = E_0 \sin[\omega n \Delta t + \phi_{i+1/2,j_1-1,k}] \quad \text{(equation 14)}$$

where $\phi$i+½,j1−1,k indicates the phase of the electric field in the grid coordinates (i+½, j−1,k).

Described above is the case in which an electromagnetic wave travels parallel to the coordinates axis. It is also possible to generate a plane wave of uniform intensity by avoiding the diffraction under the similar concept when diagonal travel is performed.

As described above, in the method of enclosing by the excitation planes the area in which the electromagnetic wave propagates, the calculation performed when a plane wave enters the microscatterer shown in FIG. 5.

FIG. 5 is an explanatory view of the calculation of a scattering electromagnetic wave by a microsphere using the conventional wave source.

FIG. 5 shows a calculation value of the electric field intensity distribution when the light having the wavelength of 400 nanometers enters a gold of 200 nanometers in diameter using the above-mentioned conventional wave source. The incident wave is a plane wave of correctly uniform intensity. The analysis area can be a little larger than the excitation plane enclosing the microscatterer, and the calculation can be performed in a small space. The example of the calculation shown in FIG. 5 shows that the conventional wave source can be effectively applied about the scattering of water vapor and fine particles in the atmosphere.

Document 1: Yee, K. S., "Numerical solution of initial boundary value problems involving Maxwell's equations" in isotropic media", IEEE Trans. Antennas and Propagation., Vol. Ap-14, p. 302-307, 1966.

Document 2: Toru Uno, "Electromagnetic Field and Antenna Analysis in FDTD Method", 1998, Corona Document 3: Allen Taflove, Susan C. Hagness: "Computational Electrodynamics" (ARTECH HOUSE, INC.)

However, in the near-field optics, a scatterer is arranged on a substrate such as glass, silicon, etc. to launch light into the substrate. FIG. 6 shows the result of calculating the analysis model using the wave source explained above in the FDTD method.

FIG. 6 shows the electric field intensity distribution obtained by launching the electromagnetic wave at the angle of incident of 45° into the reflection plane as a result of calculation using the conventional wave source.

As shown in FIG. 6, the normal of the silicon substrate is arranged to overlap the Z-axis, the electromagnetic wave of the wavelength of 400 nanometers enters at the angle of incident of 45° into the YZ plane as an incident plane. The plane contacting the substrate is not excited, but fine planes enclosing the reflection plane are excited. In FIG. 6, the electric field intensity distribution is expressed as a three-view drawing by the portion (a) as the YZ plane, the portion (b) as the ZX plane, and the portion (c) as the XY plane. The intensity distribution is non-uniform, and there is the problem that the uniformity in intensity, which is the purpose of configuring a wave source by a plurality of excitation planes, cannot be realized.

SUMMARY OF THE INVENTION

The present invention has been developed to solve the above-mentioned problem, and aims at providing an electromagnetic field simulator and an electromagnetic field simulating program product capable of setting incident light of uniform intensity for a common analysis model in which light is launched into a substrate.

The present invention has the following configuration to solve the above-mentioned problem.

That is, according to an aspect of the present invention, the electromagnetic field simulator of the present invention is an electromagnetic field simulator for repeatedly calculating a space distribution of an electromagnetic field at a next point in time using a distribution of an electromagnetic field in a 3-dimensional space, and includes: a 3-dimensional electromagnetic field calculation unit for calculating a distribution of an electric field and a distribution of an electromagnetic field on the entire 3-dimensional space; a 2-dimensional electromagnetic field calculation unit for calculating a distribution of an electric field and a distribution of an electromagnetic field on a 2-dimensional space on a cut plane obtained by cutting the 3-dimensional space by a plane; a wave source setting unit for setting a calculation result of the 2-dimensional electromagnetic field calculation unit as an excitation condition of generating an electromagnetic wave; and a wave source generation unit for generating an electromagnetic wave by forcibly vibrating a part of the electric field and the electromagnetic field of the 3-dimensional space on a basis of the excitation condition set by the wave source setting unit.

In the electromagnetic field simulator according to the present invention, it is preferable that the wave source generation unit in the 3-dimensional space is S1; a part of the wave source generation unit S1 existing on the cut plane obtained by cutting the 3-dimensional space by the plane is S2; the wave source generation unit S2 generates an electromagnetic wave by forcibly vibrating the electric field and the electromagnetic field on the cut plane; and the wave source setting unit sets a calculation result of the 2-dimensional electromagnetic field calculation unit as an excitation condition of the wave source generation unit S1.

In the electromagnetic field simulator according to the present invention, it is preferable that the wave source generation unit S1 is configured by an excitation plane for vibrating an electric field and an electromagnetic field on six planes forming a rectangular parallelepiped; the 2-dimensional electromagnetic field calculation unit cuts the 3-dimensional space by a plane parallel to any of the six excitation plane, and calculates a distribution of an electromagnetic field in a 2-dimensional space on the cut plane; and the wave source setting unit refers to a result of the 2-dimensional electromagnetic field calculation unit, and sets an excitation condition of two excitation planes parallel to the cut plane.

In addition, in the electromagnetic field simulator according to the present invention, it is preferable that a reflection plane is arranged in the 3-dimensional space, and an electromagnetic wave to be launched into the reflection plane is arranged; the 2-dimensional electromagnetic field calculation unit cuts the 3-dimensional space by a plane parallel to an incident plane with respect to the incident plane defined by a normal of the reflection plane and a wave number vector of the electromagnetic wave, and calculates a distribution of a 2-dimensional electromagnetic field on the cut plane; and the wave source setting unit sets a calculation result of the 2-dimensional electromagnetic field calculation unit as an excitation condition with respect to an excitation plane parallel to the incident plane.

In the electromagnetic field simulator according to the present invention, it is preferable that the 2-dimensional electromagnetic field calculation unit calculates distributions of plural different modes of electromagnetic fields with respect to the cut plane; and the wave source setting unit sets a calculation result of each mode calculated by the 2-dimensional electromagnetic field calculation unit as an excitation condition of the wave source calculation unit.

In the electromagnetic field simulator according to the present invention, it is preferable that the excitation conditions of the wave source generation unit S1 and the wave source generation unit S2 are the same; the 3-dimensional electromagnetic field calculation unit and the 2-dimensional electromagnetic field calculation unit respectively calculate an electromagnetic field distribution in the 3-dimensional space and an electromagnetic field distribution in the 2-dimensional space at a same point in time; and the wave source setting unit sets the calculation result of the 2-dimensional electromagnetic field calculation unit as an excitation condition of the wave source generation unit S1.

According to an aspect of the present invention, the electromagnetic field simulating program product of the present invention is an electromagnetic field simulating program product for repeatedly calculating a space distribution of an electromagnetic field at a next point in time using a distribution of an electromagnetic field in a 3-dimensional space, and is used to direct a computer to realize the functions including: a 3-dimensional electromagnetic field calculating function of calculating a distribution of an electric field and a distribution of an electromagnetic field on the entire 3-dimensional space; a 2-dimensional electromagnetic field calculating function of calculating a distribution of an electric field and a distribution of an electromagnetic field on a 2-dimensional space on a cut plane obtained by cutting the 3-dimensional space by a plane; a wave source setting function of setting a calculation result of the 2-dimensional electromagnetic field calculating function as an excitation condition of generating an electromagnetic wave; and a wave source generating function of generating an electromagnetic wave by forcibly vibrating a part of the electric field and the electromagnetic field of the 3-dimensional space on a basis of the excitation condition set by the wave source setting function.

BRIEF DESCRIPTION OF THE DRAWINGS

FIG. 8 shows the configuration of the 2-dimensional analysis model;

FIG. 9 is a block diagram of the electromagnetic field simulator according to the first mode for embodying the present invention;

FIG. 12 shows the electric field intensity distribution by the 2-dimensional FDTD method calculation;

FIG. 14 shows the electric field intensity distribution in which an electromagnetic wave enters at the incident angle of 45° on the reflection plane calculated using the wave source of the present invention;

FIG. 15 shows the calculation result to which the present invention is applied to the reflection plane having a diffraction grating structure;

FIG. 16 shows the configuration of the hardware of the electromagnetic field simulator according to the present invention.

DESCRIPTION OF THE PREFERRED EMBODIMENTS

The embodiments of the present invention are explained below by referring to the attached drawings.

Non-uniform incident intensity occurs by the interference of an incident wave and a reflected wave when there is a substrate for reflecting an electromagnetic wave on an analysis target. This phenomenon occurs not only in calculation, but also when light is actually launched into the reflection plane. Therefore, an actual phenomenon is reproduced for the intensity distribution in the direction perpendicular to the substrate, and is not an incorrect result. However, with respect to the direction parallel to the substrate, uniform intensity is required if the beam diameter is sufficiently large, and there is not a small difference between an analysis and an actual phenomenon. This is caused by the excitation condition of a wave source.

Figure 1:
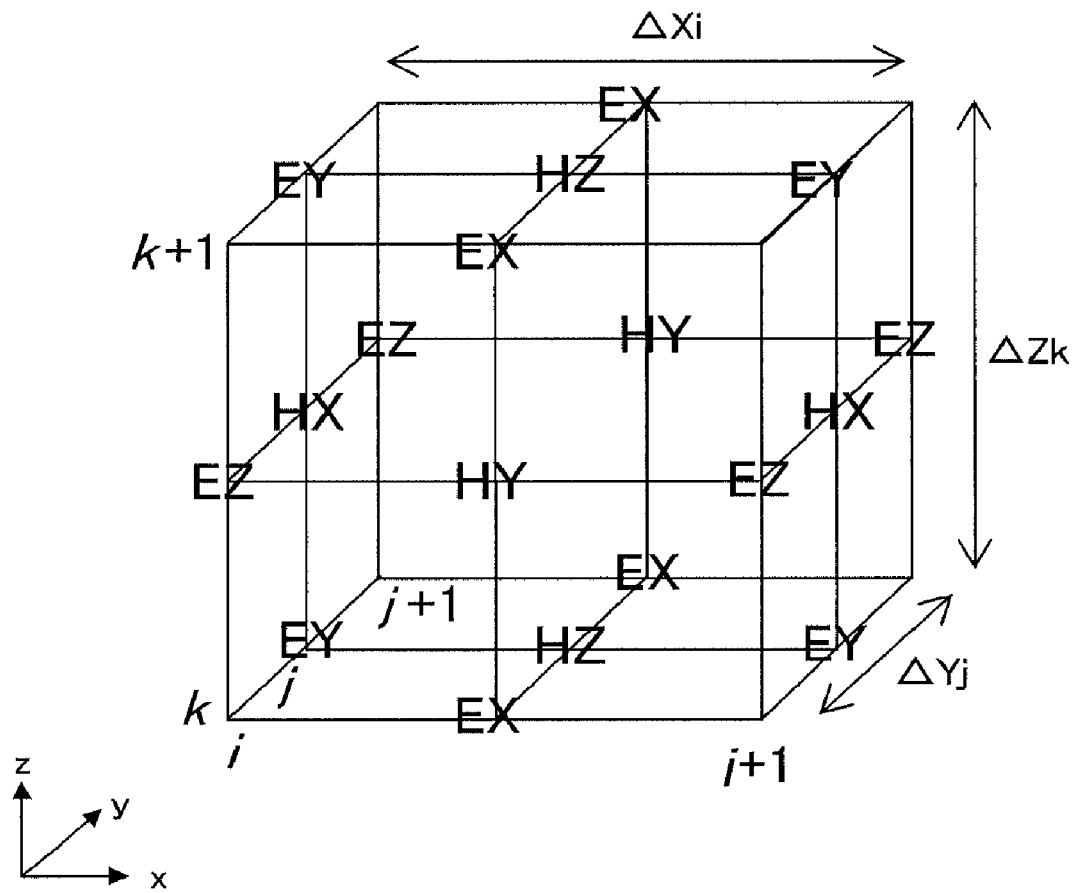
FIG. 1 shows the arrangement of each component of an electric field and an electromagnetic field in the FDTD method.
Figure 2:
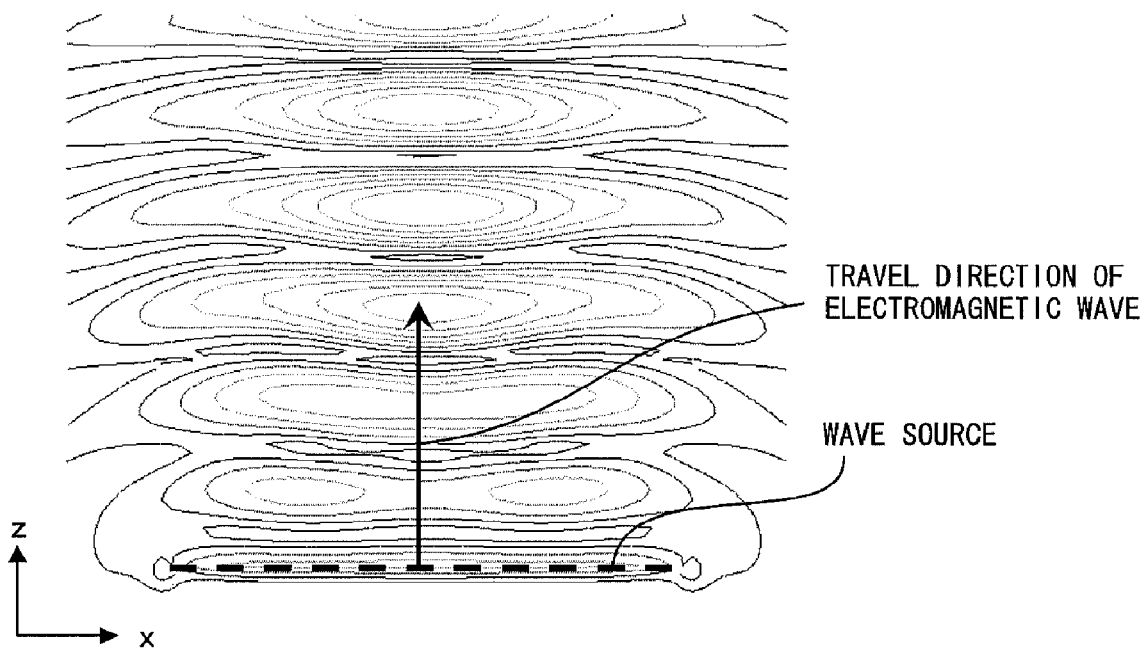
FIG. 2 shows an electric field distribution of an electromagnetic wave generated when an electric field is excited with a uniform amplitude and phase on one excitation plane at a wave source.
Figure 3:
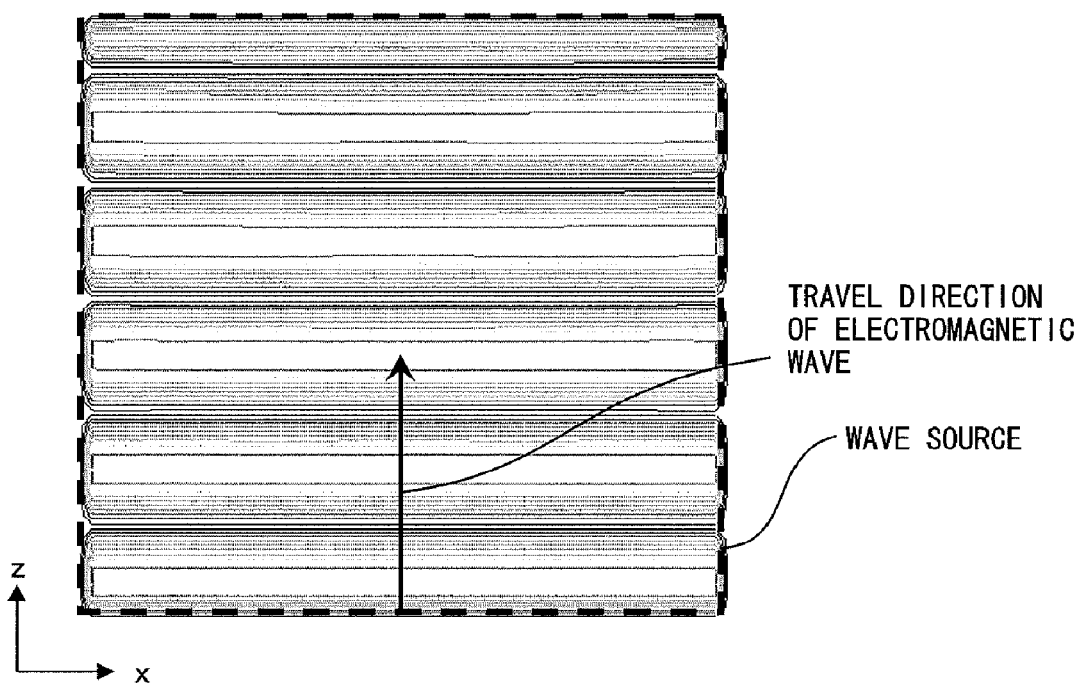
FIG. 3 shows the electric field intensity distribution of an electromagnetic wave propagating from the wave source configured by six excitation planes.
Figure 4:
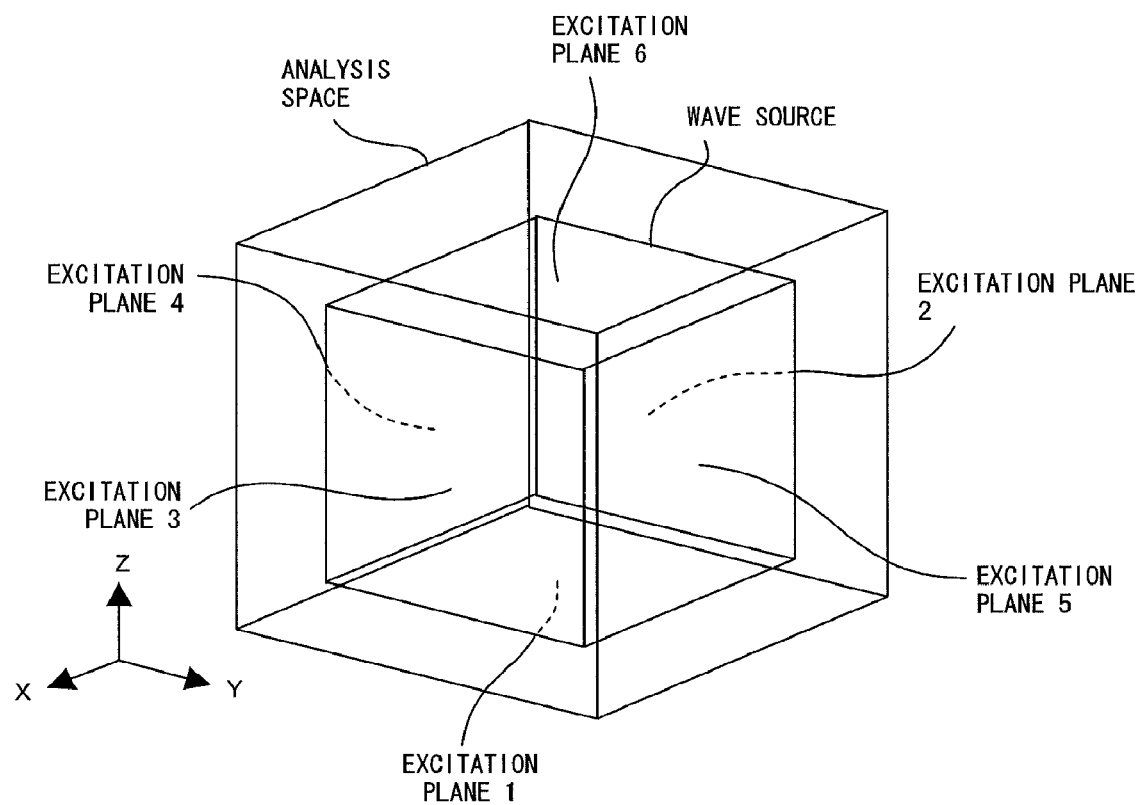
FIG. 4 shows the conventional wave source configured by six excitation planes.
Figure 5:
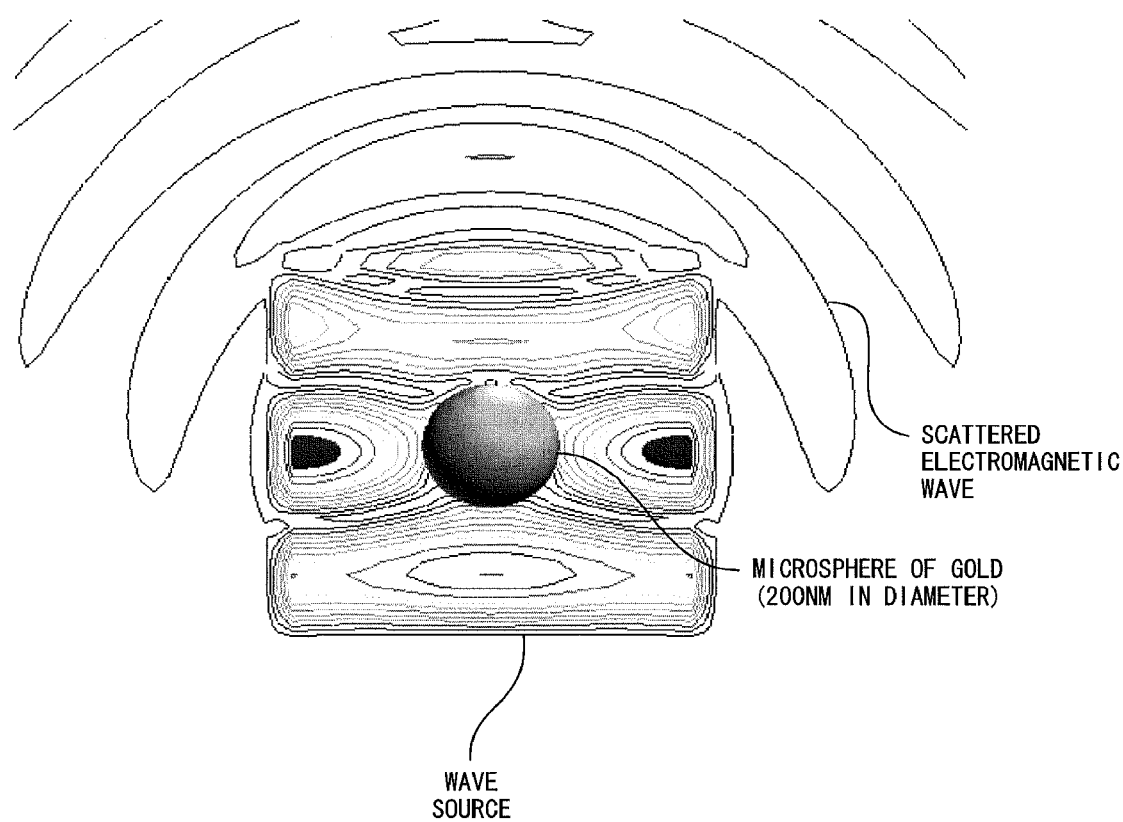
FIG. 5 is an explanatory view of the calculation of a scattering electromagnetic wave by a microsphere using the conventional wave source.

The reason for not possibly and uniformly setting a direction parallel to the substrate is that the excitation condition of the electric field and the electromagnetic field 3 of the excitation plane is not set on the basis of the reflection from the substrate. For example, in the electric field distribution on the substrate shown on the YZ plane (a) in FIG. 6, an intensity distribution parallel to the substrate is formed by the interference of the incident electromagnetic wave and the electromagnetic wave reflected by the substrate. It is clearly different from the propagation of the electromagnetic wave in the free space shown in FIG. 3, but reproduces an actual phenomenon.

On the other hand, the excitation condition of an excitation plane assumes an electromagnetic wave propagating the free space shown by the above-mentioned equations 9 and 14. By the difference between the internal electromagnetic wave and excitation plane, the diffraction cannot be removed, and the intensity is non-uniform To keep uniform intensity, it is necessary to set the excitation condition as a condition reflecting the intensity distribution caused by the reflection of the substrate.

According to the present invention, as well as the 3-dimensional analysis model calculation for obtaining an excitation condition including the reflection of the substrate, the section of an analysis model is modeled in a 2-dimensional array, and the 2-dimensional FDTD method calculation is performed. The 2-dimensional model also includes a reflection plane, and a calculation result is the same as that of the section of the electromagnetic wave distribution of the 3-dimensional analysis model. By reflecting the data on the excitation condition, the excitation condition including the reflection component of the substrate can be set.

Figure 7:
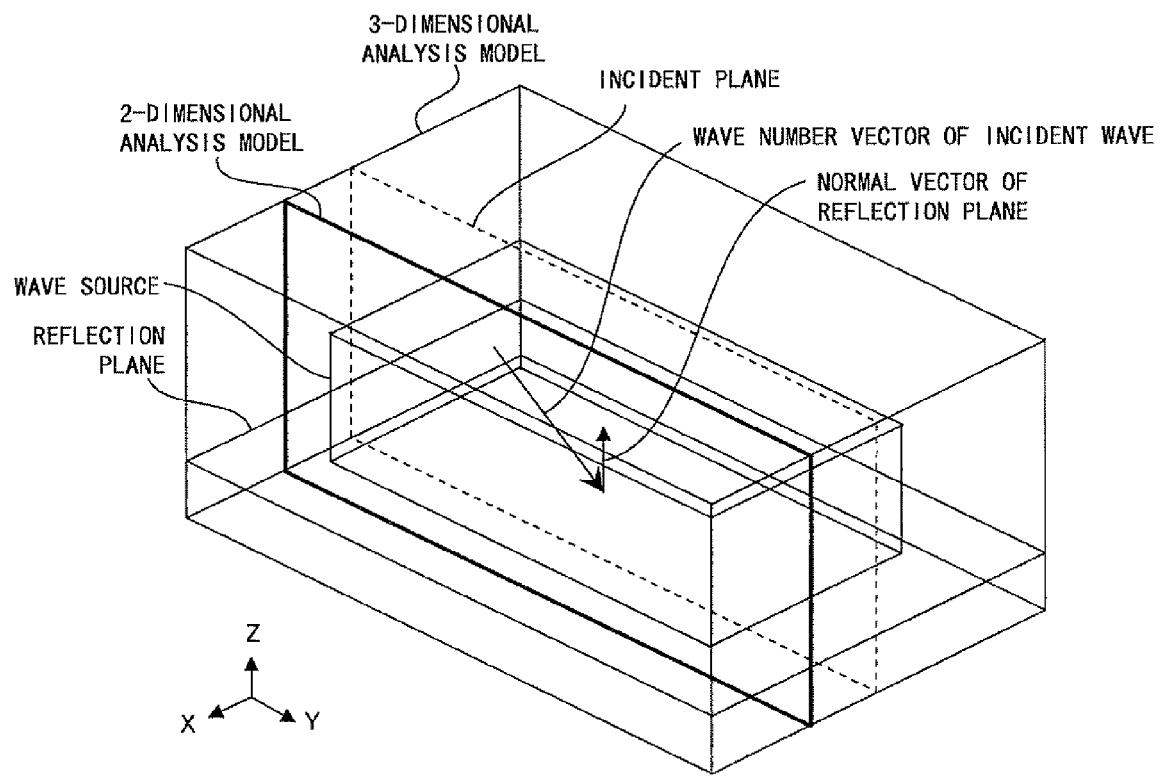
FIG. 7 shows the relationship between the 3-dimensional analysis model and the 2-dimensional analysis model.

FIG. 7 shows the relationship between the 3-dimensional analysis model and the 2-dimensional analysis model.

The method of the present invention is explained below by referring to FIG. 7.

The reflection plane is perpendicular to the Z-axis, and an electromagnetic wave is launched into the reflection plane at the incident angle of 45° using the plane perpendicular to the X-axis as an incident plane. The cut plane obtained by cutting the 3-dimensional analysis model by a plane parallel to the incident plane is calculated as a 2-dimensional analysis model in the 2-dimensional FDTD method. Although it can be optionally determined using which coordinates on the X-axis the model is to be cut. However, since a scatterer is arranged around the center in many cases, it is desired that a cut plane near the excitation plane is used. The grid coordinates of the cut plane are defined as iS.

FIG. 8 shows the configuration of a 2-dimensional analysis model.

First, consider the case in which the electric field vibration is S polarized only in the X direction. The 2-dimensional FDTD method is a TM mode, and calculates only Ex, Hy, and Hz in all electromagnetic field component. The calculation is performed by the following equations 15, 16, and 17.

$$Ex_{2D}|_{j,k}^{n} = Cx_{i_S+1/2,j,k} Ex_{2D}|_{j,k}^{n-1} + \qquad \text{(equation 15)}$$

$$Gx_{i_S+1/2,j,k}\left\{\frac{Hz_{2D}|_{j+1/2,k}^{n-1/2} - Hz_{2D}|_{j-1/2,k}^{n-1/2}}{\Delta y} - \frac{Hy_{2D}|_{j,k+1/2}^{n-1/2} - Hy_{2D}|_{j,k-1/2}^{n-1/2}}{\Delta z}\right\}$$

$$Hy_{2D}|_{j,k+1/2}^{n+1/2} = \qquad \text{(equation 16)}$$

$$Hy_{2D}|_{j,k+1/2}^{n-1/2} - By_{i_S+1/2,j,k+1/2}\left(\frac{Ex_{2D}|_{j,k+1}^{n} - Ex_{2D}|_{j,k}^{n}}{\Delta z}\right)$$

$$Hz_{2D}|_{j+1/2,k}^{n+1/2} = \qquad \text{(equation 17)}$$

$$Hz_{2D}|_{j+1/2,k}^{n-1/2} + Bz_{i_S+1/2,j+1/2,k}\left(\frac{Ex_{2D}|_{j+1,k}^{n} - Ex_{2D}|_{j,k}^{n}}{\Delta y}\right)$$

where the subscripts 2D is added to the electric field and the magnetic field to discriminate them from electromagnetic field component. The factors of a 3-dimensional model can be used as is for the factors Cx, Cx, By, and Bz in the equations. Also in the 2-dimensional FDTD method, a wave source is required as shown in FIG. 8, and there is a linear excitation area parallel to the Y-axis and the Z-axis. In this process, the excitation condition of the 3-dimensional model is applied as is. In the calculation, the calculation in the 2-dimensional FDTD method by the equations above is performed parallel to the equations of the 3-dimensional FDTD method. By the calculation in the 2-dimensional FDTD method, the electromagnetic field in the TM mode including the reflection plane is calculated.

By the obtained E x 2D, H y 2D, and H z 2D, the following equations 18 and 19 are applied to the excitation condition of the excitation plane on the grid coordinates I1 parallel to the incident plane.

$$Ey|_{i_1,j+1/2,k}^{n} = Ey|_{i_1,j+1/2,k}^{n} + Gy_{i_1,j+1/2,k}\frac{Hz_{2D}|_{j+1/2,k}^{n-1/2}}{\Delta x} \qquad \text{(equation 18)}$$

$$Ez|_{i_1,j,k+1/2}^{n} = Ez|_{i_1,j,k+1/2}^{n} - Gz_{i_1,j,k+1/2}\frac{Hy_{2D}|_{j,k+1/2}^{n-1/2}}{\Delta x} \qquad \text{(equation 19)}$$

In the equation 19 above, the amplitude and the phase in the magnetic field are calculated as an electromagnetic wave propagating in a free space, but the value obtained in the 2-dimensional FDTD method is applied in the present invention. Thus, an excitation condition including a reflected wave is set.

Next, consider the case of the P polarization in which electric field vibration is parallel to the incident plane.

At this time, the electric field vibration has a Y component and a Z component. The electromagnetic wave propagating in the cut 2-dimensional area enters the TE mode, and the electromagnetic field components to be calculated are Ey, Ez, and Hx. The calculation in the 2-dimensional FDTD method is performed by the following equations 20, 21, and 22.

$$Ey_{2D}|_{j+1/2,k}^{n} = Cy_{i_S,j+1/2,k} Ey_{2D}|_{j+1/2,k}^{n-1} + \qquad \text{(equation 20)}$$

$$Gy_{i_S,j+1/2,k}\left(\frac{Hx_{2D}|_{j+1/2,k+1/2}^{n-1/2} - Hx_{2D}|_{j+1/2,k-1/2}^{n-1/2}}{\Delta z}\right)$$

$$Ez_{2D}|_{j,k+1/2}^{n} = Cz_{i_S,j,k+1/2} Ez_{2D}|_{j,k+1/2}^{n-1} - \qquad \text{(equation 21)}$$

$$Gz_{i_S,j,k+1/2}\left(\frac{Hx_{2D}|_{j+1/2,k+1/2}^{n-1/2} - Hx_{2D}|_{j-1/2,k+1/2}^{n-1/2}}{\Delta y}\right)$$

$$Hx_{2D}|_{j+1/2,k+1/2}^{n+1/2} = Hx_{2D}|_{j+1/2,k+1/2}^{n-1/2} + \qquad \text{(equation 22)}$$

$$Bx_{i_S,j+1/2,k+1/2}\left(\frac{Ey_{2D}|_{j+1/2,k+1}^{n} - Ey_{2D}|_{j+1/2,k}^{n}}{\Delta z} - \frac{Ez_{2D}|_{j+1,k+1/2}^{n} - Ez_{2D}|_{j,k+1/2}^{n}}{\Delta y}\right)$$

where the factors of the 3-dimensional model are applied as is for the factors Cy, Gy, Cz, Gz, and Bx as in the TM mode. The same holds true with the wave source. Thus, the following equations 23 and 24 are applied to the excitation condition of the excitation plane parallel to the incident plane.

$$Hy|_{i_1-1,j,k+1/2}^{n+1/2} = Hy|_{i_1-1,j,k+1/2}^{n+1/2} - By_{i_1-1,j,k+1/2}\frac{Ez_{2D}|_{j,k+1/2}^{n}}{\Delta x} \qquad \text{(equation 23)}$$

$$Hz|_{i_1-1,j+1/2,k}^{n+1/2} = Hz|_{i_1-1,j+1/2,k}^{n+1/2} + Bz_{i_1-1,j+1/2,k}\frac{Ey_{2D}|_{j+1/2,k}^{n}}{\Delta x} \qquad \text{(equation 24)}$$

FIG. 9 is a block diagram of an electromagnetic field simulator according to the first mode for embodying the present invention.

In FIG. 9, an electromagnetic field simulator 1300 includes an object input unit 1301, a calculation condition input unit 1302, an incident light input unit 1303, a 3D-FDTD method calculation factor setting unit 1304, an incident plane setting unit 1305, a 2D-FDTD method calculation area setting unit 1306, a 3D-FDTD method electromagnetic field calculation unit 1307, a 2D-FDTD electromagnetic field calculation unit 1308, a wave source excitation condition calculation unit 1309, a calculation result analysis unit 1310, and an analysis result output unit 1311.

The object input unit 1301 inputs the shape and the arrangement of an object of an analysis model. Practically, it inputs the space distribution of the permittivity, the conductivity, and the permeability as the electromagnetic characteristics of the object. The calculation condition input unit 1302 inputs the grid intervals in space and time and the number of calculation steps for performing the FDTD method calculation. The incident light input unit 1303 sets the wavelength of the incident light to the object, the polarization, the incident direction, etc.

The 3D-FDTD method calculation factor setting unit 1304 calculates the factor of the calculating equation of the electromagnetic field applied to the 3-dimensional FDTD method calculation from the data input by the object input unit 1301, the calculation condition input unit 1302, and the incident light input unit 1303. The incident plane setting unit 1305 defines an incident plane from the input data of the object input unit 1301 and the incident light input unit 1303. The 2D-FDTD method calculation area setting unit 1306 cuts 3-dimensional analysis model by the plane parallel to the incident plane, and sets an area in which the 2-dimensional FDTD method calculation required in the present invention is performed.

The 3D-FDTD method electromagnetic field calculation unit 1307 performs a electromagnetic field calculation on the entire analysis area in the 3-dimensional FDTD method. At this timer the excitation condition of the wave source calculated by the wave source excitation condition calculation unit 1309 is referenced. Relating to the 2-dimensional area set by the 2D-FDTD method calculation area setting unit 1306, the 2D-FDTD electromagnetic field calculation unit 1308 performs an electromagnetic field calculation in the 2-dimensional FDTD method to which a factor calculated by the 3D-FDTD method calculation factor setting unit 1304 is applied. The wave source excitation condition calculation unit 1309 obtains the excitation condition of the wave source in the 3-dimensional FDTD method from the result of the 2-dimensional electromagnetic field calculation by the 2D-FDTD electromagnetic field calculation unit 1308.

These 3D-FDTD method electromagnetic field calculation unit 1307, the 2D-FDTD electromagnetic field calculation unit 1308, and the wave source excitation condition calculation unit 1309 repeatedly perform calculations in each time step until the number of calculation steps set by the calculation condition input unit 1302 is reached.

The calculation result analysis unit 1310 calculates the physical amount such as the light intensity and the like from the time-series data of the electromagnetic field after the completion of the analysis. The analysis result output unit 1311 performs an output process such as displaying the calculated physical amount on a display device, storing it on a magnetic disk, etc.

Figure 10:
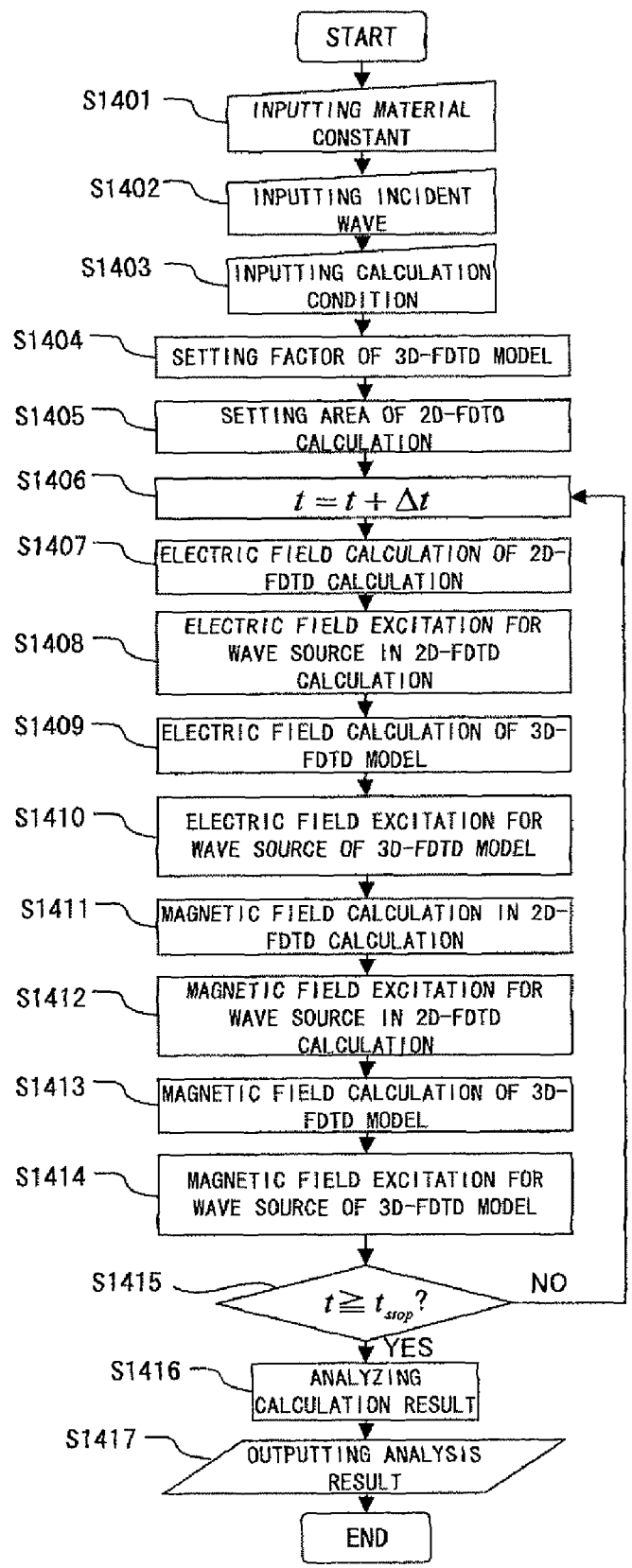
FIG. 10 is a flowchart showing the flow of the electromagnetic field simulating program according to the first mode for embodying the present invention.

FIG. 10 is a flowchart showing the flow of the electromagnetic field simulator according to the first mode for embodying the present invention.

The flowchart shown in FIG. 10 executes the electromagnetic field simulator shown in FIG. 9 using a computer. In the FDTD method, since the electric field calculation and magnetic field calculation are shifted by a ½ time grid, the electric field calculation is first performed in accordance with the flowchart shown in FIG. 10, and the magnetic field calculation is performed next. In the present invention, the 3-dimensional calculation for calculating an analysis area and the 2-dimensional calculation for calculating the excitation condition of a wave source are performed, but it is necessary to shift the process between the electric field and the magnetic field. In addition, since the 3-dimensional calculation refers to a result of the 2-dimensional calculation, the processes are performed in the following order. That is, the 2-dimensional electric field calculation is performed first, the 3-dimensional electric field calculation is performed next, then the 2-dimensional magnetic field calculation is performed, and finally the 3-dimensional magnetic field calculation is performed, thereby terminating one step of the calculating process.

Practically, in step S1401, the space arrangement of the material constants such as the permittivity, the conductivity, the permeability, etc. is input. In step S1402, an incident wave is set. In step S1403, the analysis condition such as grid intervals in space and time, etc. is set for calculation in the FDTD method.

Then, in step S1404, the factors in the equations 3 and 4 calculated in the 3-dimensional FDTD method are calculated from the data input in step S1401, S1402, and S1403. In step S1405, an incident plane is defined from the data in step S1401 and step S1402, and a cut plane obtained by cutting the 3-dimensional model by a plane parallel to the incident plane is set as an area in which the 2-dimensional FDTD method is performed.

The next steps S1406 through S1415 are the process steps for the electromagnetic field calculation in the FDTD method.

The steps S1407 through S1410 are electric field calculation steps, and steps S1411 through S1414 are magnetic field calculation steps.

First, in step S1406, the analysis time is 1 step advanced.

In step S1407, the electric field calculation in the 2-dimensional FDTD method calculation for obtaining the excitation condition of the wave source is performed. In step S1408, the electric field exciting process is performed on the wave source of the 2-dimensional FDTD method calculation. In step S1409, the electric field calculation of the 3-dimensional FDTD method calculation is performed in an analysis space. Then, in step S1410, the electric field exciting process is performed by referring to the result of the 2-dimensional FDTD method calculation in steps S1407 and S1408 with respect to the wave source of the 3-dimensional FDTD method calculation Next, in step S1411, the magnetic field calculation of the 2-dimensional FDTD method calculation is performed. In step S1412, the magnetic field excitation of the wave source of the 2-dimensional calculation is performed. In step S1413, the magnetic field calculation of the 3-dimensional FDTD method calculation is performed on an analysis space. In step S1414, the magnetic field excitation is processed by referring to the result of the 2-dimensional FDTD method calculation with respect to the wave source of the 3-dimensional calculation. In step S1415, it is determined whether or not the analysis time has reached the analysis termination time tstop. If it is determined that the termination time has not been reached (NO in step S1415), control is returned to step S1406. If it is determined that the termination time has been reached (YES in step S1415), control is passed to step S1416. In step S1416, a necessary physical amount is calculated from the electromagnetic field data obtained in the FDTD method calculation.

Finally, in step S1417, an output process such as displaying the physical amount obtained in step S1416 on the display device, storing it on a magnetic disk, etc. is performed.

Explained next is the second mode for embodying the present invention.

Figure 11:
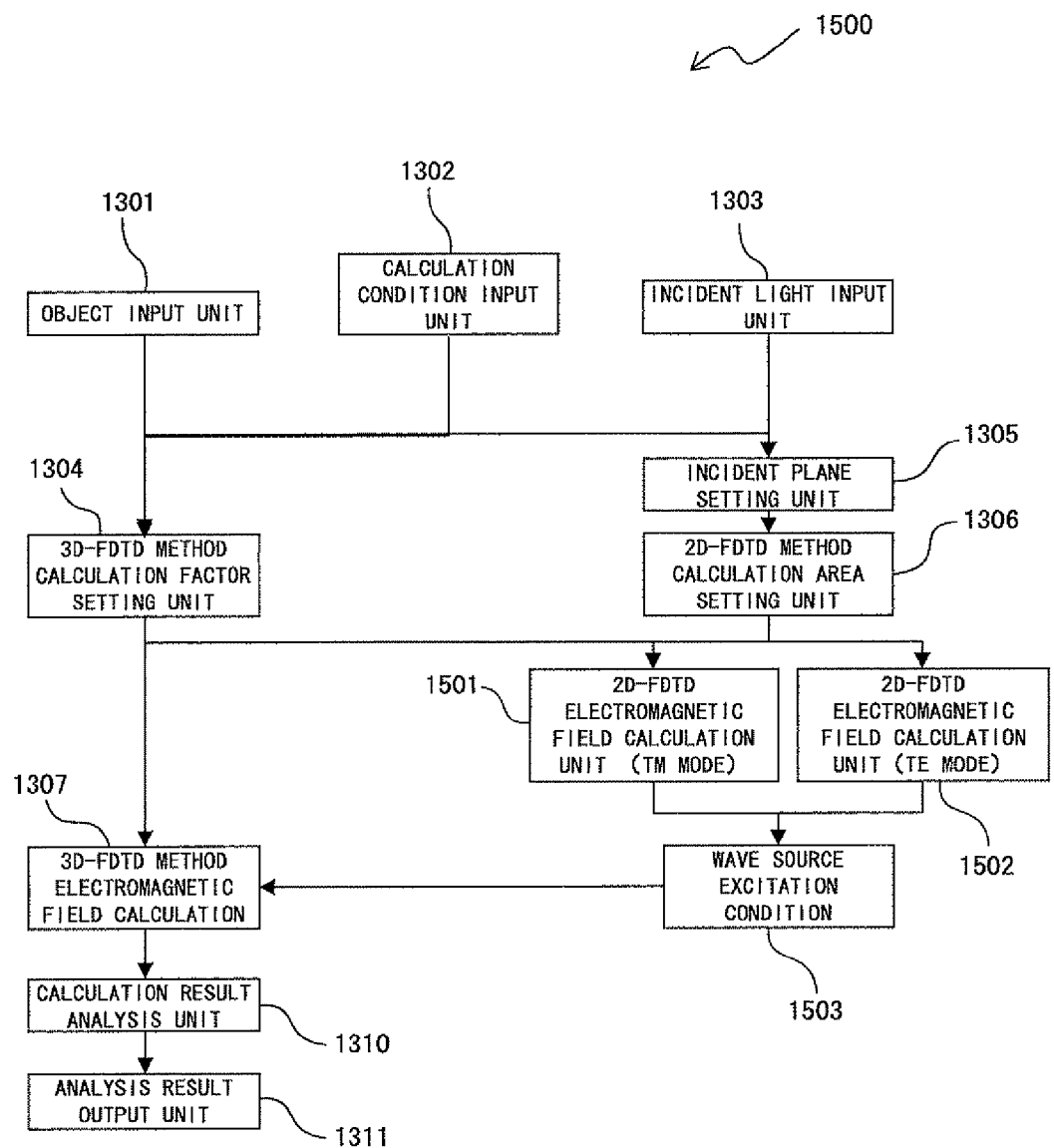
FIG. 11 is a block diagram of the electromagnetic field simulator according to the second mode for embodying the present invention.

FIG. 11 is a block diagram of the electromagnetic field simulator according to the second mode for embodying the present invention.

In FIG. 11, an electromagnetic field simulator 1500 is used in processing an incident wave having arbitrary polarization in the wave source according to the present invention.

When the 2-dimensional FDTD method according to the first mode for embodying the present invention is used once, all electromagnetic field component s in the 3-dimensional space cannot be calculated. Therefore, two types of 2-dimensional FDTD method calculations, that is, a TM mode by a 2D-FDTD electromagnetic field calculation unit (TM mode) 1501 and a TE mode by a 2D-FDTD electromagnetic field calculation unit (TE mode) 1502, are performed. A wave source excitation condition calculation unit 1503 calculates the excitation condition of a wave source from the results of the two types of 2-dimensional FDTD method calculations, that is, the TM mode by the 2D-FDTD electromagnetic field calculation unit (TE mode) 1502 and the TE mode by the 2D-FDTD electromagnetic field calculation unit (TE mode) 1502. By setting the ratio of the electric field intensity between the two types of 2-dimensional FDTD method calculations, and the relative phase difference, the incident light of arbitrary linear polarization and oval polarization can be processed.

FIG. 12 shows the magnetic field intensity distribution by the 2-dimensional FDTD method calculation.

Figure 6:
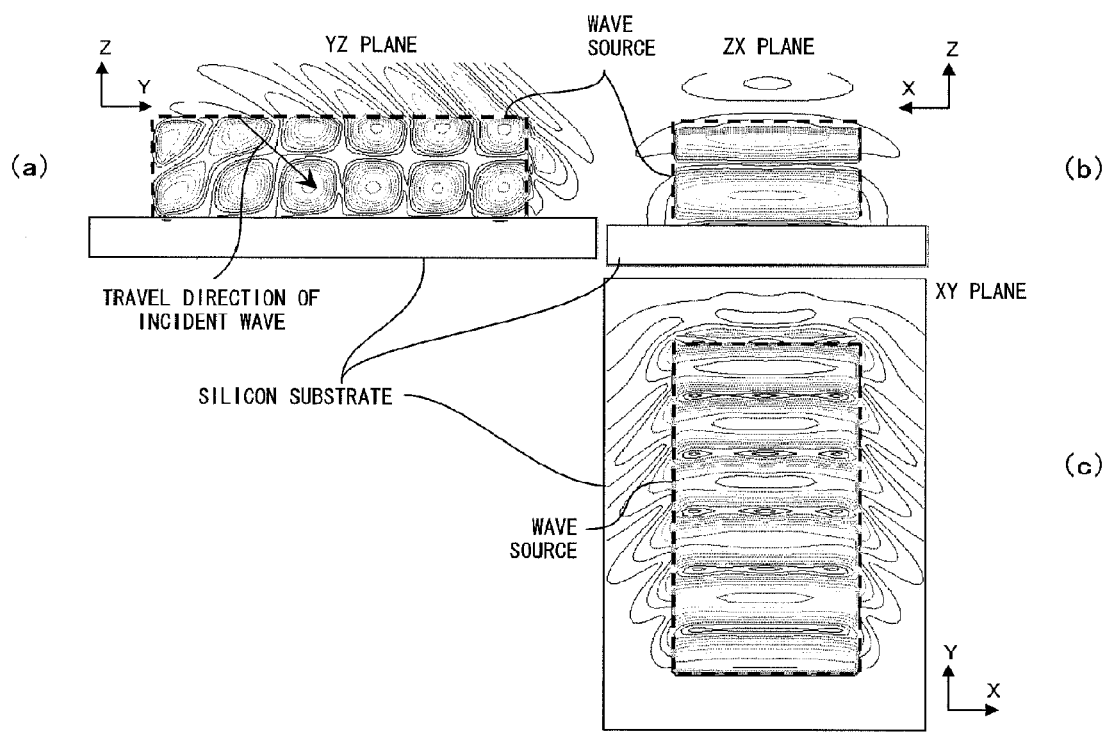
FIG. 6 shows the electric field intensity distribution obtained by launching the electromagnetic wave at the angle of incident of 45° into the reflection plane as a result of calculation using the conventional wave source.

As described above, a model is cut by the plane parallel to the incident plane with respect to the 3-dimensional model shown in FIG. 6, and the 2-dimensional FDTD method calculation is applied on the cut plane. Then, the distribution of the magnetic field component obtained by the 2-dimensional FDTD method calculation is expressed as shown in FIG. 12. The portion (a) shown in FIG. 12 indicates the magnetic field Y component, and the portion (b) indicates the magnetic field Z component.

Figure 13:
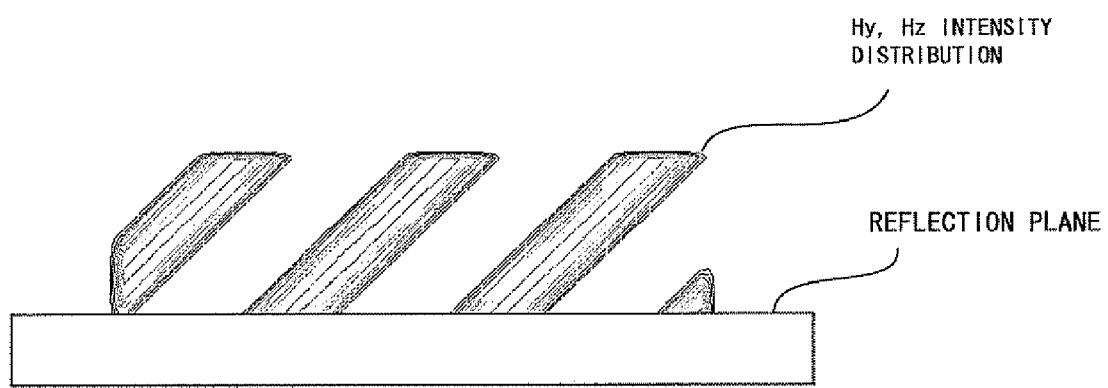
FIG. 13 shows the electric field intensity distribution on the excitation plane of the conventional wave source.

For comparison, FIG. 13 shows the electric field distribution on the excitation plane of the conventional wave source.

In the conventional method, since the electric field amplitude is calculated on the basis of the propagation in a free space, the influence of a silicon substrate is not reflected at all. However, according to the present invention, the distribution including the interference of the incident wave and the reflected wave is obtained by performing the 2-dimensional FDTD method calculation on the cut plane.

FIG. 14 shows the electric field intensity distribution in which an electromagnetic wave enters at the incident angle of 45° on the reflection plane calculated using the wave source of the present invention.

FIG. 14 shows the calculation result obtained when the magnetic field distribution, in which the incident wave and the reflected wave obtained by performing the 2-dimensional FDTD method calculation on the cut plane interferes, is applied to the excitation condition by the above-mentioned equations 18 and 19. By correctly setting the excitation condition on the excitation plane parallel to the incident plane, the intensity distribution in the X direction is uniform.

In the present invention, the 2-dimensional FDTD method calculation is performed parallel to the 3-dimensional FDTD method calculation for actual analysis. However, the calculation cost including the amount of memory used, the computation time, etc. can be reduced. Assume that the number of grids in each coordinate direction of the 3-dimensional analysis model is (Nx, Ny, Nz). If the present invention is applied when the incident plane is perpendicular to the X-axis, the number of grids in the 2-dimensional FDTD method is (Ny, Nz). The calculation in the 2-dimensional FDTD method calculation itself can be simpler than in the 3-dimensional method. However, if the entire computational complexity is roughly estimated, the calculation is similar to the case in which the number of 3-dimensional grids is of (Nx+2, Ny, Nz).

As described above, when the two types of 2-dimensional FDTD method calculations, that is, the TM mode and the TE mode, are performed to process any polarization, the number of 3-dimensional grids is assumed as (Nx+2, Ny, Nz). That is, it is assumed that one or more grids in the X direction are increased by one or two. It can be recognized as sufficiently small as compared with the computational complexity in the entire 3-dimensional FDTD method.

The calculation in the FDTD method can be performed only by arithmetic operations by the equations 3 and 4 above, and it is not necessary to use a trigonometric function, which requires a high computation cost, on the entire excitation plane by the equations 9 and 14 used for normal wave sources. Therefore, the present invention can be applied with a low computation cost.

FIG. 15 shows a result of the calculation in which the present invention is applied on the reflection plane having the diffraction grating structure.

Since the present invention used the FDTD method in calculating the calculation condition, the generalized characteristic on the analytic shape of the FDTD method works effectively. For example, as shown in FIG. 15, although a substrate has a groove structure, the 2-dimensional calculation can correctly regenerate the intensity distribution including the diffraction by the groove shape, the distribution of incident light of uniform intensity can be set.

FIG. 15 shows an example of the calculation to which the present invention is applied. Like the flat reflection plane as shown in FIG. 14, it can be confirmed that the intensity distribution in the X direction is uniformly set.

If the intensity distribution in the X direction is uniformly set according to the present invention, the characteristic of the incident wave does not depend on the size of the wave source in the X direction, the wave source in the X direction and the analysis area can be within the minimum range surrounding the sphere as a scatterer. If an analysis area can be small, both amount of used memory and calculation time can be reduced, thereby largely contributing to the computation cost reduction.

The present invention can also process an incident wave having arbitrary polarization. The above-mentioned equations 15 through 17 refer to the 2-dimensional FDTD method calculation in the TM mode, the equations 20 through 22 refers to the 2-dimensional FDTD method calculation in the TE mode. For a 3-dimensional analysis model, they respectively correspond to the S polarization and the P polarization. By simultaneously performing the two 2-dimensional FDTD method calculations, and relatively shifting the phase for application to the wave source of a 3-dimensional model, not only the linear polarization, but also any polarization such as a circular polarization, oval polarization, etc. can be set.

As described above, the modes for embodying the present invention have been explained below by referring to the attached drawings. However, the electromagnetic field simulator to which the present invention is applied is not limited to the above-mentioned modes for embodying the present invention so far as its functions can be performed. That is, it can be used as a single device, used in a system including a plurality of devices, used as an integrated device, or used in a system in which processes are performed over a network such as a LAN, a WAN, etc.

As shown in FIG. 16, a system including a CPU 91 connected to a bus 98, memory 92 such as ROM, RAM, etc., an input device 93, an output device 94, an external storage device 95, a medium drive device 96, a portable recording medium 99, and a network connection device 97 can be realized. That is, the memory 92 such as the ROM, the RAM, etc., the external storage device 95, and the portable recording medium 99 storing a program code of software for realizing a system of the above-mentioned mode for embodying the present invention can be provided for an electromagnetic field simulator, and a computer of the electromagnetic field simulator can read and execute the program code to attain the system.

In this case, the program code itself read from the portable recording medium 99 and the like realizes a new function of the present invention, and the portable recording medium 99 and the like that records the program code can constitute the present invention.

The portable recording medium 99 for providing a program code can be, for example, CD-ROM, CD-R, DVD-ROM, DVD-RAM, magnetic tape, a non-volatile memory card, a ROM card, and various recording media through the network connection device 97 (that is, a communication circuit) for e-mail, personal computer communication, etc.

Figure 17:
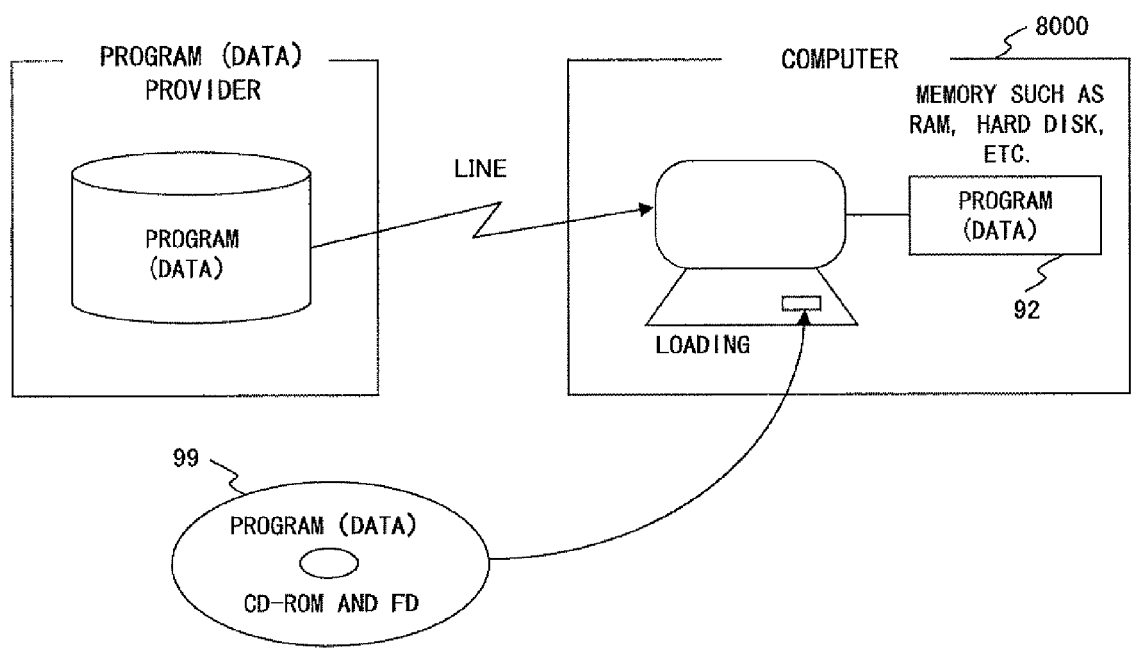
FIG. 17 is an explanatory view showing the load of the electromagnetic field simulating program according to the present invention on the computer.

Furthermore, as shown in FIG. 17, a computer 8000 executes a program code read to the memory 92, thereby realizing the function of the above-mentioned mode for embodying the present invention. Additionally, the OS and the like operating on the computer 8000 can perform all or a part of an actual process according to the instruction of the program code, thereby realizing the function of the above-mentioned mode for embodying the present invention.

Furthermore, after a program code read from the portable recording medium 99 and the program (data) provided by a program (data) provider is written to a function expansion board inserted into the computer 8000 or the memory 92 provided for a function expansion unit connected to the computer 8000, the CPU and the lime provided for the function expansion board and the function expansion unit performs all or a part of the actual process at an instruction of the program code, and the processes can be realized of the function according to the mode for embodying the present invention.

That is, the present invention is not limited to the above-mentioned mode for embodying the present invention, but can be realized as various configuration s or shapes within the scope of the gist of the present invention.

According to the present invention, incident light of uniform intensity can be set for a common analysis model in which light launched into a substrate is reflected.

What is claimed is:

1. An electromagnetic field simulator for repeatedly calculating a distribution of an electromagnetic field in a 3-dimensional space, comprising:
   a processor; and
   a memory operatively coupled to the processor, the processor configured to execute a process including:
      first calculating, using a finite-difference time-domain method, a distribution of an electric field component of the electromagnetic field and a distribution of a magnetic field component of the electromagnetic field at a first point in time using the distribution of electromagnetic field at a previous, second point in time on the 3-dimensional space,
      second calculating, using the finite-difference time-domain method, distributions of the electric field components of TM mode and TE mode of the electromagnetic field and distributions of TM mode and TE mode of the magnetic field component of the electromagnetic field at the first point in time using the distribution of electromagnetic field at the second point in time on a 2-dimensional space on a cut plane obtained by cutting the 3-dimensional space by a plane,
      setting an excitation condition of generating an electromagnetic wave in the 3-dimensional space by using a calculation result of said second calculating the distribution of the electric field component of the electromagnetic field and the distribution of the magnetic field component of the electromagnetic field at the first point in time using the distribution of electromagnetic field at the second point in time, and
      third calculating a distribution of the electromagnetic field generating an electromagnetic wave by forcibly vibrating the electromagnetic field in a part of the 3-dimensional space by using the calculation result of each mode calculated by said second calculating as the excitation condition, wherein:
   said first calculating, said second calculating, said setting, and said third calculating are repeatedly performed by using the excitation condition, and
   a 2-dimensional electric field calculation of said second calculating is performed first, a 3-dimensional electric field calculation of said first calculating is performed next, then a 2-dimensional magnetic field calculation of said second calculating is performed, and finally a 3-dimensional magnetic field calculation of said first calculating is performed.

2. The simulator according to claim 1, wherein:
   said third calculating calculates the distribution of the electromagnetic field on an excitation plane for vibrating the electromagnetic field on six planes forming a rectangular parallelepiped;
   said second calculating calculates the distribution of the electric field component of the electromagnetic field and the distribution of the magnetic field component of the electromagnetic field in the 2-dimensional space on the cut plane obtained by cutting the 3-dimensional space by a parallel plane to any of the six excitation planes; and
   said setting refers to a result of said second calculating, and sets the excitation condition of two parallel excitation planes to the cut plane.

3. The simulator according to claim 1, wherein:
   said second calculating calculates the distribution of the electric field component of the electromagnetic field and the distribution of the magnetic field component of the electromagnetic field on the cut plane, which obtained by cutting the 3-dimensional space by a parallel plane to an incident plane defined by a normal of a reflection plane arranged in the 3-dimensional space and a wave number vector of an electromagnetic wave impinging on the reflection plane arranged; and
   said setting sets an excitation condition on a parallel excitation plane to the incident plane by using a calculation result of said second calculating.

4. The simulator according to claim 1, wherein: said first calculating and said second calculating respectively calculate the distribution of the electric field component of the electromagnetic field and the distribution of the magnetic field component of the electromagnetic field in the 3-dimensional space and the distribution of the electric field component of the electromagnetic field and the distribution of the magnetic field component of the electromagnetic field in the 2-dimensional space at a same point in time; and
   said setting sets an excitation condition of said third calculating by using the calculation result of said second calculating.

5. A non-transitory computer readable storage medium for storing an electromagnetic field simulating program for repeatedly calculating a space distribution of an electromagnetic field in a 3-dimensional space, the electromagnetic field simulating program causing a computer to perform a process comprising:
   first calculating, using a finite-difference time-domain method, a distribution of an electric field component of the electromagnetic field and a distribution of a magnetic field component of the electromagnetic field at a first point in time using the distribution of electromagnetic field at a previous, second point in time on the 3-dimensional space;
   second calculating, using the finite-difference time-domain method, distributions of the electric field components of TM mode and TE mode of the electromagnetic field and distributions of TM mode and TE mode of the magnetic field component of the electromagnetic field at the first point in time using the distribution of electromagnetic field at the second point in time on a 2-dimensional space on a cut plane obtained by cutting the 3-dimensional space by a plane;
   setting an excitation condition of generating an electromagnetic wave in the 3-dimensional space by using a calculation result of said second calculating the distribution of the electric field component of the electromagnetic field and the distribution of the magnetic field component of the electromagnetic field at the first point in time using the distribution of electromagnetic field at the second point in time; and third calculating a distribution of the electromagnetic field generating an electromagnetic wave in the 3-dimensional space by forcibly vibrating the electromagnetic field in a part of the 3-dimensional space by using a calculation result of each mode calculated by said second calculating as the excitation condition, wherein:

said first calculating, said second calculating, said setting, and said third calculating are repeatedly performed by using the excitation condition, and a 2-dimensional electric field calculation of said second calculating is performed first, a 3-dimensional electric field calculation of said first calculating is performed next, then a 2-dimensional magnetic field calculation of said second calculating is performed, and finally a 3-dimensional magnetic field calculation of said first calculating is performed.

6. A method for repeatedly calculating a distribution of an electromagnetic field in a 3-dimensional space, comprising:

first calculating, using a finite-difference time-domain method by a central processing unit, a distribution of an electric field component of the electromagnetic field and a distribution of a magnetic field component of the electromagnetic field at a first point in time using the distribution of electromagnetic field at a previous, second point in time on the 3-dimensional space;

second calculating, using the finite-difference time-domain method by the central processing unit, distributions of the electric field components of TM mode and TE mode of the electromagnetic field and distributions of TM mode and TE mode of the magnetic field component of the electromagnetic field at the first point in time using the distribution of electromagnetic field at the second point in time on a 2-dimensional space on a cut plane obtained by cutting the 3-dimensional space by a plane;

setting, using the central processing unit, an excitation condition of generating an electromagnetic wave in the 3-dimensional space by using a calculation result said second of calculating the distribution of the electric field component of the electromagnetic field and the distribution of the magnetic field component of the electromagnetic field at the first point in time using the distribution of electromagnetic field at the second point in time; and third calculating, using the central processing unit, a distribution of the electromagnetic field generating an electromagnetic wave in the 3-dimensional space by forcibly vibrating the electromagnetic field in a part of the 3-dimensional space by using the calculation result of each mode calculated by said second calculating as the excitation condition, wherein:

said first calculating, said second calculating, said setting, and said third calculating are repeatedly performed by using the excitation condition, and a 2-dimensional electric field calculation of said second calculating is performed first, a 3-dimensional electric field calculation of said first calculating is performed next, then a 2-dimensional magnetic field calculation of said second calculating is performed, and finally a 3-dimensional magnetic field calculation of said first calculating is performed.

\* \* \* \* \*

UNITED STATES PATENT AND TRADEMARK OFFICE
CERTIFICATE OF CORRECTION

| | | |
|---|---|---|
| PATENT NO. | : 8,180,612 B2 | Page 1 of 1 |
| APPLICATION NO. | : 11/742529 | |
| DATED | : May 15, 2012 | |
| INVENTOR(S) | : Wataru Odajima | |

It is certified that error appears in the above-identified patent and that said Letters Patent is hereby corrected as shown below:

Title Page Column 2 (Other Publications), Line 4, Delete "fnction" and insert -- function --, therefor.

Column 18, Line 19 (Approx.), In Claim 3, delete "which obtained" and insert -- which is obtained --, therefor.

Column 20, Lines 8-9 (Approx.), In Claim 6, delete "result said second of calculating" and insert -- result of said second calculating --, therefor.

Signed and Sealed this
Seventh Day of August, 2012

David J. Kappos
*Director of the United States Patent and Trademark Office*